US012192685B2

(12) United States Patent
Tian et al.

(10) Patent No.: US 12,192,685 B2
(45) Date of Patent: Jan. 7, 2025

(54) LASER PROJECTION APPARATUS AND METHOD FOR DRIVING LASER SOURCE ASSEMBLY

(71) Applicant: Hisense Laser Display Co., Ltd, Qingdao (CN)

(72) Inventors: Youliang Tian, Qingdao (CN); Ke Yan, Qingdao (CN); Rongrong Cui, Qingdao (CN); Guangxue Liu, Qingdao (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 284 days.

(21) Appl. No.: 17/952,780

(22) Filed: Sep. 26, 2022

(65) Prior Publication Data

US 2023/0033486 A1 Feb. 2, 2023

Related U.S. Application Data

(63) Continuation of application No. PCT/CN2021/097700, filed on Jun. 1, 2021.

(30) Foreign Application Priority Data

Jun. 2, 2020 (CN) .......................... 202010490856.7
Jun. 3, 2020 (CN) .......................... 202010495287.5
Jun. 3, 2020 (CN) .......................... 202010496252.3

(51) Int. Cl.
*H04N 9/31* (2006.01)
(52) U.S. Cl.
CPC ................................ *H04N 9/3135* (2013.01)
(58) Field of Classification Search
CPC .... G03B 21/00; G03B 21/005; G03B 21/006; G03B 21/008; G03B 21/28; G03B 21/43;
(Continued)

(56) References Cited

U.S. PATENT DOCUMENTS 6,597,430 B1 7/2003 Nishi et al.
2009/0067459 A1 3/2009 Mizuuchi et al.
(Continued)

FOREIGN PATENT DOCUMENTS

CN 101299511 A 11/2008
CN 101303302 A 11/2008
(Continued)

OTHER PUBLICATIONS

International Search Report (PCT/ISA/210) and Written Opinion (PCT/ISA/237) issued in PCT Application No. PCT/CN2021/097700 dated Aug. 9, 2021 with English Translation.

(Continued)

*Primary Examiner* — Sultan Chowdhury
(74) *Attorney, Agent, or Firm* — Morgan, Lewis & Bockius LLP

(57) ABSTRACT

A laser projection apparatus includes a laser source assembly, a display control circuit, a signal shaping circuit and a laser source driving circuit. The display control circuit is configured to output a first driving signal and a second driving signal. The signal shaping circuit is coupled to the laser source driving circuit, and is configured to shape the first driving signal based on a shaping signal to obtain a target driving signal. A frequency of the target driving signal is higher than a frequency of the first driving signal. The laser source driving circuit is coupled to the laser source assembly, and is configured to receive the second driving signal and the target driving signal, and drive the laser source assembly to be turned on or turned off in response to the second driving signal and the target driving signal.

20 Claims, 14 Drawing Sheets

(58) Field of Classification Search
CPC .............. G03B 21/208; G03B 21/2006; G03B 21/2013; G03B 21/2033; G03B 21/2053; H04N 9/315; H04N 9/3111; H04N 9/3123; H04N 9/3126; H04N 9/3129; H04N 9/3135; H04N 9/3152; H04N 9/3155; H04N 9/3158; H04N 9/3161; H04N 9/3179; H01S 3/00; H01S 3/0057; H01S 3/0085; G02B 27/34; G02B 27/36; G02B 27/48; G02B 27/145; G02B 27/281
See application file for complete search history.

(56) References Cited

U.S. PATENT DOCUMENTS

| | | | |
|---|---|---|---|
| 2009/0310641 | A1 | 12/2009 | Kimura |
| 2012/0001961 | A1* | 1/2012 | Nishikawa ............... H04N 3/08 345/690 |
| 2012/0044279 | A1 | 2/2012 | Uchino et al. |
| 2012/0200833 | A1 | 8/2012 | Imai |
| 2013/0258210 | A1 | 10/2013 | Kurihara et al. |
| 2014/0092316 | A1* | 4/2014 | Rumreich ............ H04N 9/3188 348/744 |
| 2014/0240611 | A1 | 8/2014 | Kimura et al. |
| 2014/0241391 | A1 | 8/2014 | Abe |
| 2015/0287366 | A1* | 10/2015 | Miyamoto ............. G03B 33/06 345/32 |
| 2016/0006999 | A1 | 1/2016 | Kimura |
| 2016/0286183 | A1 | 9/2016 | Haraguchi et al. |
| 2017/0064265 | A1 | 3/2017 | Kimura et al. |
| 2018/0246339 | A1 | 8/2018 | Marciante |
| 2020/0204770 | A1 | 6/2020 | Kitakami et al. |

FOREIGN PATENT DOCUMENTS

| | | |
|---|---|---|
| CN | 101395772 A | 3/2009 |
| CN | 102103270 A | 6/2011 |
| CN | 103368067 A | 10/2013 |
| CN | 103813146 A | 5/2014 |
| CN | 103890829 A | 6/2014 |
| CN | 104009391 A | 8/2014 |
| CN | 104808352 A | 7/2015 |
| CN | 105158922 A | 12/2015 |
| CN | 107357124 A | 11/2017 |
| CN | 108292822 A | 7/2018 |
| CN | 108534986 A | 9/2018 |
| CN | 109061895 A | 12/2018 |
| CN | 109683340 A | 4/2019 |
| CN | 109788264 A | 5/2019 |
| CN | 109795321 A | 5/2019 |
| CN | 109960097 A | 7/2019 |
| CN | 110262174 A | 9/2019 |
| CN | 110780517 A | 2/2020 |
| CN | 210092560 U | 2/2020 |
| CN | 110928123 A | 3/2020 |
| CN | 111025832 A | 4/2020 |
| CN | 111683235 A | 9/2020 |
| CN | 111698487 A | 9/2020 |
| EP | 0959378 A1 | 11/1999 |
| EP | 2426545 A1 | 3/2012 |
| JP | H-05189799 A | 7/1993 |
| JP | 2010-276689 A | 12/2010 |
| JP | 2014-182322 A | 9/2014 |
| WO | 2010125866 A1 | 11/2010 |
| WO | 2016139978 A1 | 9/2016 |
| WO | 2019044537 A1 | 3/2019 |

OTHER PUBLICATIONS

International Search Report (PCT/ISA/210) and Written Opinion (PCT/ISA/237) issued in PCT Application No. PCT/CN2021/097702 dated Aug. 30, 2021 with English Translation.
Office Action issued in corresponding Chinese Patent Application No. 202010490856.7 dated Apr. 21, 2022 with English Translation.
Office Action issued in corresponding Chinese Patent Application No. 202010495287.5 dated May 31, 2022 with English Translation.
Office Action issued in corresponding Chinese Patent Application No. 202010495287.5 dated Jul. 27, 2021 with English Translation.
Office Action issued in corresponding Chinese Patent Application No. 202010495287.5 dated Mar. 2, 2022 with English Translation.
Jia Qlong-yao et al. "Speckle Homogenization in Laser Projecion Display" Electronic Engineering College . . . , China, vol. 37, No. 3, May 2013.
Office Action issued in corresponding Chinese Patent Application No. 202010496252.3 dated Mar. 3, 2022 with English Translation.
Office Action issued in corresponding Chinese Patent Application No. 202010496252.3 dated Jul. 7, 2021 with English Translation.

* cited by examiner

LASER PROJECTION APPARATUS AND METHOD FOR DRIVING LASER SOURCE ASSEMBLY

CROSS-REFERENCE TO RELATED APPLICATIONS

This application is a continuation application of International Application No. PCT/CN2021/097700, with an international filing date of 1 Jun. 2021, which claims priority to Chinese Patent Application No. 202010490856.7, filed on 2 Jun. 2020, Chinese Patent Application No. 202010495287.5, filed on 3 Jun. 2020, and Chinese Patent Application No. 202010496252.3, filed on 3 Jun. 2020, the entireties of which are incorporated herein by reference.

TECHNICAL FIELD

The present disclosure relates to the field of projection display, and in particular, to a laser projection apparatus and a method for driving a laser source assembly.

BACKGROUND

A projection apparatus may include a laser source. After laser beams emitted by the laser source are projected onto a projection screen, it may be possible to achieve a purpose of projecting an image onto the projection screen.

SUMMARY

In an aspect, embodiments of the present disclosure provide a laser projection apparatus, which includes a laser source assembly, an optical engine, a projection lens, a display control circuit, a signal shaping circuit, and a laser source driving circuit. The laser source assembly is configured to provide illumination beams. The optical engine is configured to modulate the illumination beams with an image signal to obtain projection beams. The projection lens is configured to project the projection beams into an image. The display control circuit is coupled to the signal shaping circuit and the laser source driving circuit, and is configured to output a first driving signal and a second driving signal. The first driving signal includes one of an enable signal and a current control signal, and the second driving signal includes another of the enable signal and the current control signal. The signal shaping circuit is coupled to the laser source driving circuit, and is configured to shape the first driving signal based on a shaping signal to obtain a target driving signal. A frequency of the target driving signal is higher than a frequency of the first driving signal. The laser source driving circuit is coupled to the laser source assembly, and is configured to receive the second driving signal and the target driving signal, and drive the laser source assembly to be turned on or turned off in response to the second driving signal and the target driving signal.

In another aspect, embodiments of the present disclosure provide a method for driving a laser source assembly, which is applied to a laser projection apparatus. The laser projection apparatus includes a laser source assembly, a laser source driving circuit, a display control circuit, and a signal shaping circuit. The method includes the following steps. First, the display control circuit outputs a first driving signal and a second driving signal. The first driving signal includes one of an enable signal and a current control signal, and the second driving signal includes another of the enable signal and the current control signal. Then, the signal shaping circuit shapes the first driving signal based on a shaping signal to obtain a target driving signal. A frequency of the target driving signal is higher than a frequency of the first driving signal. Finally, the laser source driving circuit receives the second driving signal and the target driving signal, and drives the laser source assembly to be turned on or turned off in response to the second driving signal and the target driving signal.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal to which the embodiments of the present disclosure relate.

DETAILED DESCRIPTION

Figure 1:
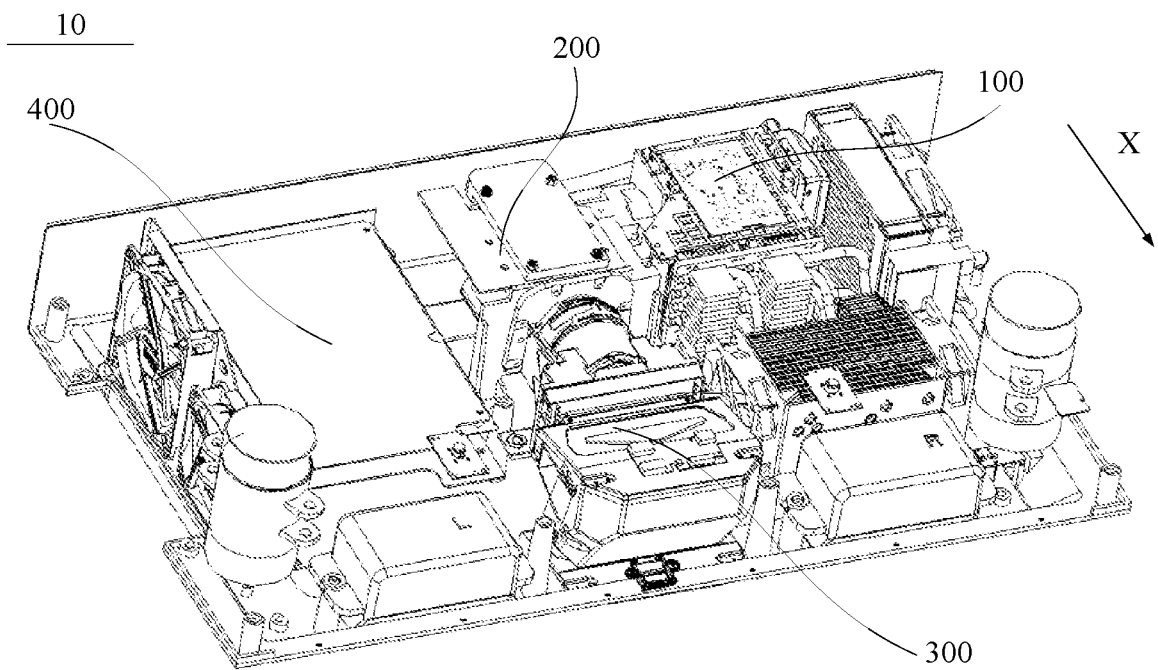
FIG. 1 is a structural diagram of a laser projection apparatus, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to".

In the description of the specification, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly include one or more of the features. In the description of the embodiments of the present disclosure, the terms "a plurality of" and "the plurality of" each mean two or more unless otherwise specified.

In the description of some embodiments, the term "connected" and its extensions may be used. For example, the term "connected" may be used when describing some embodiments to indicate that two or more components are in direct physical contact or electrical contact with each other. However, the term "connected" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if", depending on the context, is optionally construed as "when" or "in a case where" or "in response to determining" or "in response to detecting". Similarly, the phrase "if it is determined" or "if [a stated condition or event] is detected", depending on the context, is optionally construed as "in a case where it is determined" or "in response to determining" or "in a case where [the stated condition or event] is detected" or "in response to detecting [the stated condition or event]".

The use of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

As used herein, the term "about", "substantially" or "approximately" includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; the term "equal" includes absolute equality and approximate equality, and an acceptable range of deviation of the approximate equality may be, for example, a difference between two equals of less than or equal to 5% of either of the two equals.

In a laser projection system, due to the high coherence of laser beams, when laser beams emitted by a laser projection apparatus are irradiated on a projection screen, bright and dark dots may appear in the image. Such phenomenon is called speckle, which will affect the projection effect.

In view of this, some embodiments of the present disclosure provide a laser projection apparatus. As shown in FIG. 1, the laser projection apparatus includes a host 10, and the host 10 includes a laser source assembly 100, an optical engine 200, and a lens 300. The laser source assembly 100 is configured to provide illumination beams (laser beams). The optical engine 200 is configured to modulate the illumination beams provided by the laser source assembly 100 with an image signal to obtain projection beams. The projection lens 300 is configured to project the projection beams into an image on a projection screen or a wall. The laser source assembly 100, the optical engine 200, and the projection lens 300 are sequentially connected in a propagation direction of beams, and are wrapped by corresponding housings. The housings of the laser source assembly 100, the optical engine 200 and the projection lens 300 provide support for respective optical components and make sure that the optical components meet certain sealing or airtight requirements.

An end of the optical engine 200 is connected to the projection lens 300, and the optical engine 200 and the projection lens 300 are arranged in a first direction X of the entire apparatus. For example, the first direction X is a width direction of the entire apparatus. Another end of the optical engine 200 is connected to the laser source assembly 100. In this example, a direction in which the laser source assembly 100 is connected to the optical engine 200 is perpendicular to a direction in which the optical engine 200 is connected to the projection lens 300. Such a connection structure may not only adapt to characteristics of a beam path of a reflective light valve in the optical engine 200, but may also reduce a length of a beam path in a single dimension and thus facilitate structural arrangement of the entire apparatus.

Figure 2A:
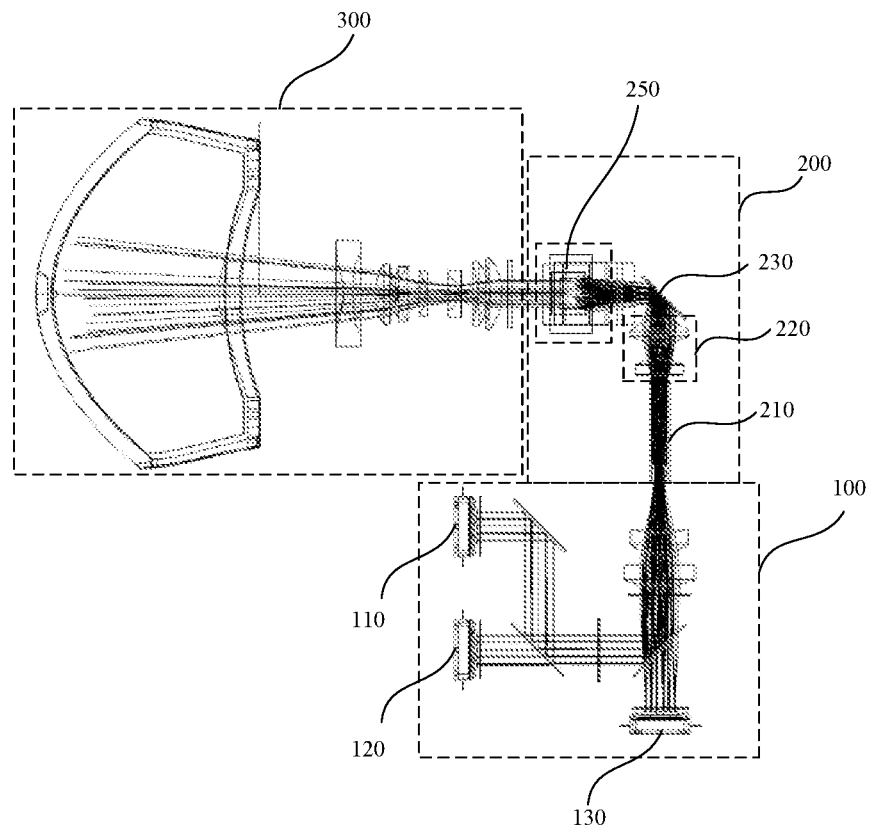
FIG. 2A is a schematic diagram of a laser source assembly, an optical engine, and a projection lens in a laser projection apparatus, in accordance with some embodiments of the present disclosure.

In some embodiments, the laser source assembly 100 includes at least one group of lasers. For example, one group of lasers are lasers corresponding to a certain primary color. For example, one group of lasers may be a laser array corresponding to a certain primary color, and the laser array may be abbreviated as a "laser". As shown in FIG. 2A, in an example where the laser source assembly 100 includes three laser arrays, the three laser arrays may be a red laser array 130, a green laser array 120 and a blue laser array 110, respectively. However, it is not limited thereto. The three laser arrays may also be all blue laser arrays 110, or two laser arrays are blue laser arrays 110 and one laser array is a red laser array 130. In a case where a plurality of lasers included in the laser source assembly 100 can generate three primary colors, the laser source assembly 100 can generate illumination beams of three primary colors; therefore, there is no need to provide a phosphor wheel in the laser source assembly 100 (in a case where one or more laser arrays included in the laser source assembly 100 can only generate laser beams of one or two colors, the laser beams of existing colors need to be used to excite the phosphor wheel to generate fluorescent beams of other colors, so that the laser beams and the fluorescent beams together form white beams). As a result, a structure of the laser source assembly 100 may be simplified, and a size of the laser source assembly 100 may be reduced.

In some embodiments, the laser source assembly 100 includes two laser arrays. In an example where the laser source assembly 100 is a two-color laser source, the two laser arrays may be a blue laser array 110 and a red laser array 130. The two laser arrays may also be both blue laser arrays 110, that is, the laser source assembly 100 is a single-color laser source.

In some other embodiments, the laser source assembly 100 may also include a single laser array. That is, the laser source assembly 100 is a single-color laser source, and only includes a blue laser array 110.

Figure 4:
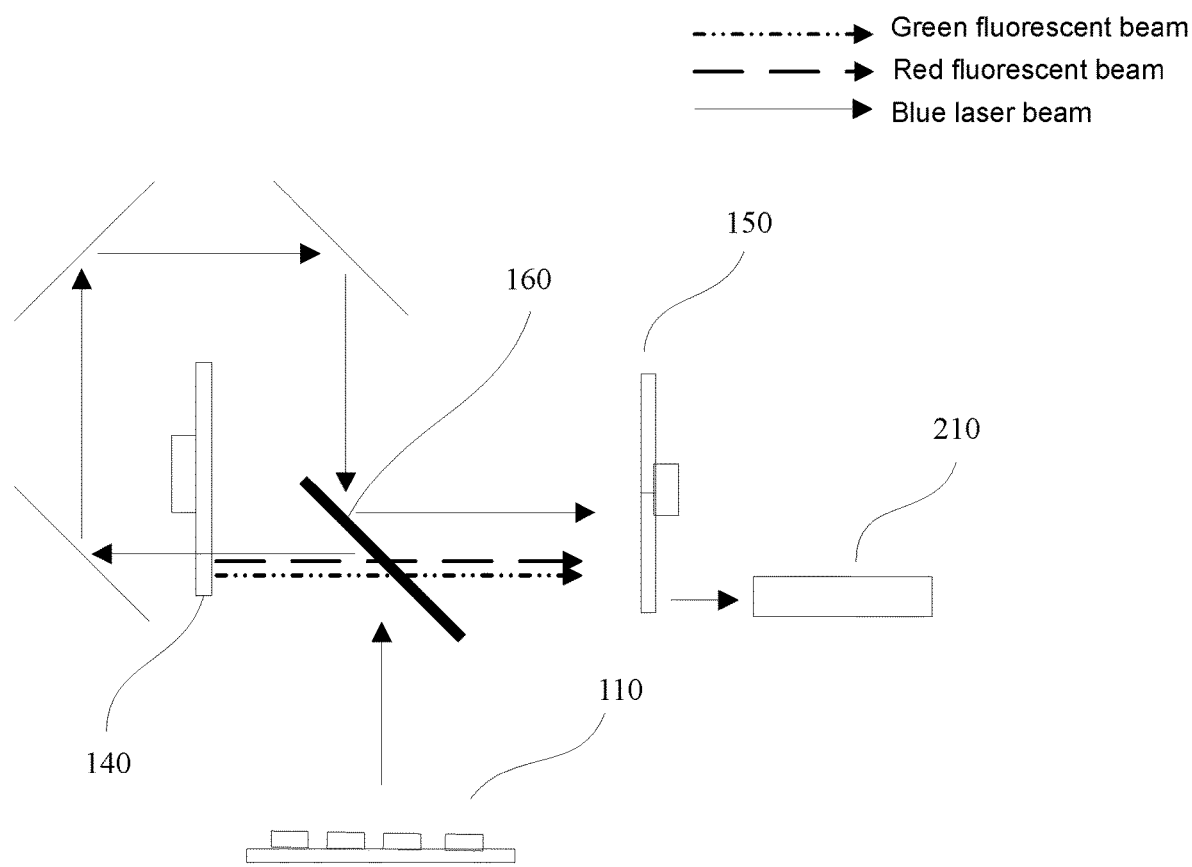
FIG. 4 is a schematic diagram showing a principle of a beam path of a laser source assembly in a laser projection apparatus, in accordance with some embodiments of the present disclosure.

As shown in FIG. 4, the laser array may be a blue laser array 110, and the laser source assembly 100 may further include a phosphor wheel 140 and a color filter wheel 150. After the blue laser array 110 emits blue beams, a part of the blue beams irradiate the phosphor wheel 140 to generate red fluorescent beams (in a case where the laser source assembly 100 includes a red laser array 130, there is no need to generate red fluorescent beams) and green fluorescent beams. The blue laser beams, the red fluorescent beams (or red laser beams) and the green fluorescent beams pass through a beam combination mirror 160 in turn, and then pass through the color filter wheel 150 to be filtered; and finally, beams of three primary colors are output sequentially. According to a phenomenon called persistence of vision, the human eyes cannot tell the color of a beam at an exact moment. Therefore, in this case, the human eyes will perceive a mixture of the three primary colors, that is, white beams.

For example, the laser source assembly 100 may include a single laser array which is able to emit at least two colors of laser beams of the blue laser beams, the red laser beams and the green laser beams.

In some embodiments, the laser may be a semiconductor laser with a PN junction. For a semiconductor laser to emit laser beams, the following three conditions must be met.

Condition 1: under laser beam irradiation, a population inversion must be produced, that is, the number of particles in a high energy state must be larger than the number of particles in a low energy state.

Condition 2: a resonant cavity must be provided, since a suitable resonant cavity can play a feedback role to cause stimulated radiation photons to multiply and thereby generate laser oscillation.

Condition 3: a gain is greater than a loss, that is, a certain threshold condition must be satisfied, so that a photon gain is equal to or greater than a photon loss.

Figure 2B:
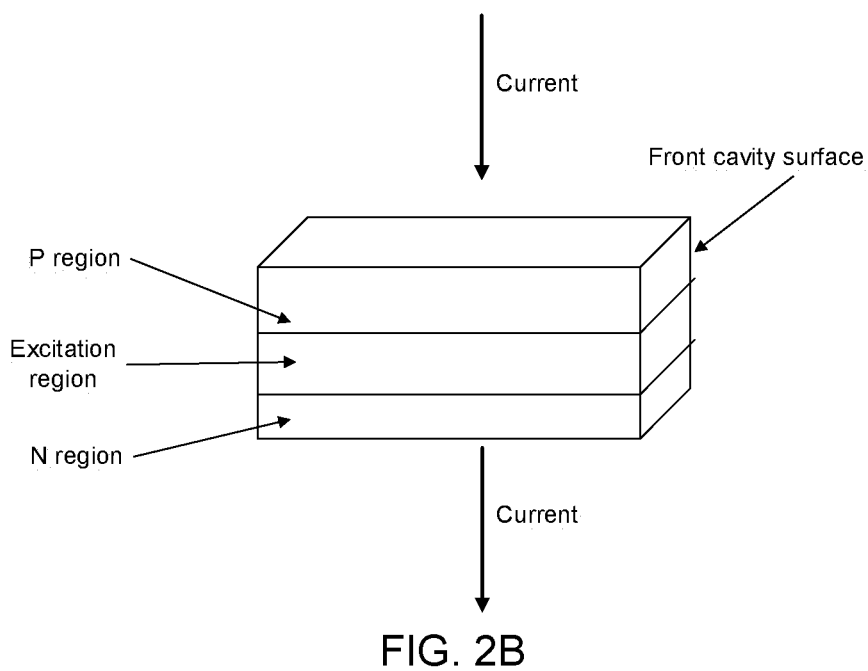
FIG. 2B is a structural diagram of a semiconductor laser in a laser projection apparatus, in accordance with some embodiments of the present disclosure.

As shown in FIG. 2B, the semiconductor laser includes a P region, an excitation region, and an N region. When a forward bias voltage is applied to the semiconductor laser, the N region may inject electrons into the P region, and the P region may inject holes into the N region. When sufficient photon energy is radiated, and the above conditions 1 to 3 are satisfied, steady-state excitation may be achieved. Photon radiation propagates strictly in a plane of the PN junction, and optical radiation with a same wavelength, a same phase, and a same intensity is output from an excitation region of a front cavity surface. As such, laser beams may be output. After reaching a steady state, the semiconductor laser may be able to output steady laser beams.

As for the PN junction, as long as a forward bias voltage is applied to the PN junction, the N region will inject electrons into the P region, the P region will inject holes into the N region, and excess energy will be released in the form of photons upon spontaneous recombination of the electrons and holes in the excitation region (also known as the active layer or active region) into electron-hole pairs. In this case, the emitted photons are in different phases and directions, and such radiation is referred to as spontaneous radiation. As for the semiconductor laser, only when a driving current reaches a threshold current (to be able to turn on the laser) can the laser emit laser beams. If the driving current output to the laser does not reach its threshold current, the laser may also emit beams. However, in this case, the beams emitted by the laser are fluorescent beams.

Figure 3:
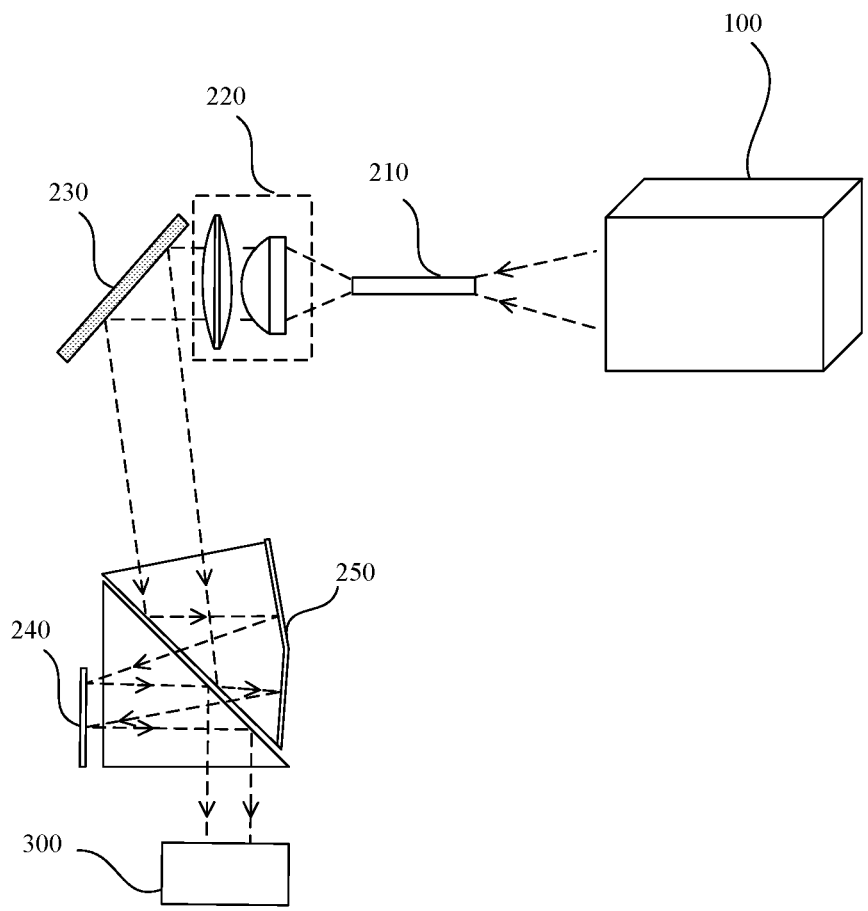
FIG. 3 is an architecture diagram of a beam path in a laser projection apparatus, in accordance with some embodiments of the present disclosure.

The illumination beams emitted by the laser source assembly 100 enter the optical engine 200. Referring to FIGS. 2A and 3, the optical engine 200 may include a light pipe 210, a lens assembly 220, a reflector 230, a digital micromirror device (DMD) 240 and a prism assembly 250. The light pipe 210 may receive the illumination beams provided by the laser source assembly 100 and homogenize the illumination beams. The lens assembly 220 may first amplify the illumination beams, then converge the illumination beams, and finally emit the illumination beams to the reflector 230. The reflector 230 may reflect the illumination beams to the prism assembly 250. The prism assembly 250 reflects the illumination beams to the DMD 240. The DMD 240 modulates the illumination beams, and then reflects the projection beams obtained after modulation into the projection lens 300.

In the optical engine 200, the DMD 240 is a core component, which plays a role of modulating the illumination beams provided by the laser source assembly 100 with an image signal. That is, the DMD 240 controls the illumination beams to display different colors at different brightness for different pixels of an image to be displayed, so as to finally form an optical image. Therefore, the DMD 240 is also referred to as an optical modulator or a light valve.

Figure 5:
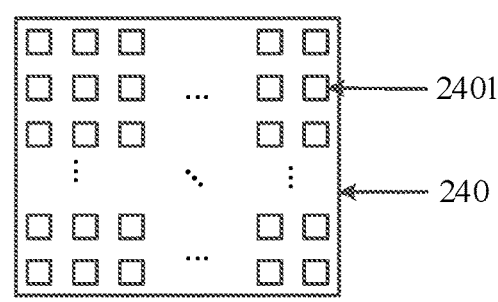
FIG. 5 is a diagram showing an arrangement of micromirrors in a digital micromirror device, in accordance with some embodiments of the present disclosure.

The DMD 240 is applied in a digital light processing (DLP) projection architecture. As shown in FIGS. 2A and 3, the optical engine 200 adopts the DLP projection architecture. As shown in FIG. 5, the DMD 240 includes thousands of micromirrors 2401 that can be individually driven to rotate. These micromirrors 2401 are arranged in an array, and each micromirror 2401 corresponds to a single pixel in the image to be displayed. In the DLP projection architecture, each micromirror 2401 is equivalent to a digital switch, and can swing within a range of plus or minus 12 degrees (i.e., ±12°) or a range of plus or minus 17 degrees (i.e., ±17°) under an action of an external electric field. In this way, the reflected beams may be imaged on a screen through the projection lens 300 along an optical axis direction to form a bright pixel.

Figure 6:
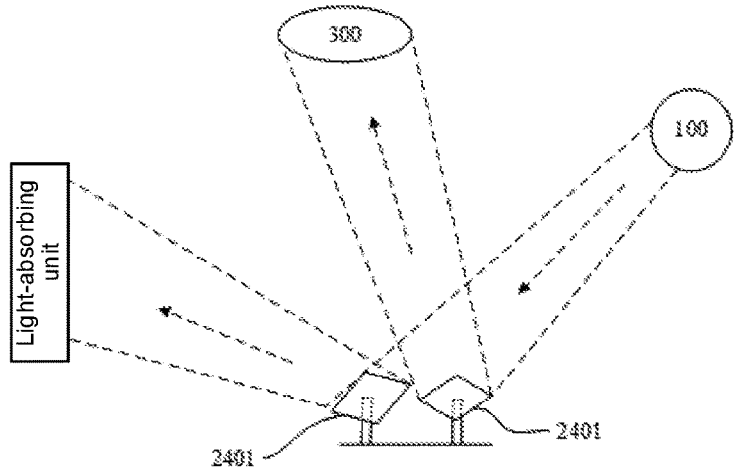
FIG. 6 is a schematic diagram showing an operation of micromirrors, in accordance with some embodiments of the present disclosure.
Figure 7:
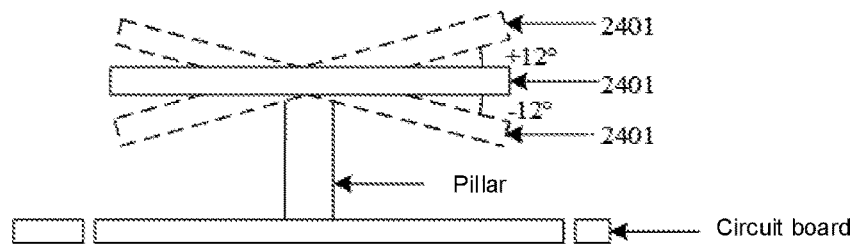
FIG. 7 is a schematic diagram showing positions a micromirror swings to in the digital micromirror device shown in FIG. 5.

For example, as shown in FIG. 7, for a micromirror 2401 with a rotation angle of ±12°, a state at +12° is an ON state, and a state at −12° is an OFF state. For a rotation angle between −12° and +12°, the actual operation states of the micromirror 2401 only include the ON state and the OFF state. As shown in FIG. 6, a beam reflected by the micromirror 2401 at a negative rotation angle is referred to as an OFF beam, and the OFF beam is an ineffective beam. A beam reflected by the micromirror 2401 at a positive rotation angle is referred to as an ON beam. The ON beam is an effective beam that enters the projection lens 300 to be used for projection imaging. After being irradiated by the illumination beams, the micromirror 2401 on a surface of the DMD 240 reflect the illumination beams at a positive rotation angle, thereby generating the effective beams. In a display cycle of a frame of image, some or all of the micromirrors 2401 are switched once between the ON state and the OFF state, so as to realize the gray scales of the pixels in the frame of image through the durations of the ON state and the OFF state of the micromirrors 2401.

The light pipe 210, the lens assembly 220 and the reflector 230 at a front end of the DMD 240 form an illumination beam path. After passing through the illumination beam path, the illumination beams emitted by the laser source assembly 100 will have a beam size and incident angle required by the DMD 240.

As shown in FIG. 2A, the projection lens 300 includes a combination of a plurality of lenses, which are usually divided by group into a three-segment combination including a front group, a middle group and a rear group, or a two-segment combination including a front group and a rear group. The front group is a lens group proximate to a laser-exit side of the projection apparatus (a left side shown in FIG. 2A), and the rear group is a lens group proximate to a laser-exit side of the optical engine 200 (a right side shown in FIG. 2A). According to the above combinations of various lens groups, the projection lens 300 may be a zoom projection lens, or a prime focus-adjustable projection lens, or a prime projection lens. In some embodiments, the laser projection apparatus is an ultra-short-focus laser projection apparatus. If the projection lens 300 is an ultra-short-focus projection lens, a projection ratio of the projection lens 300 is usually less than 0.3, for example, 0.24. The projection ratio refers to a ratio of a projection distance to a width of an image. The smaller the ratio, the larger the width of the projection image at a same projection distance. The ultra-short-focus projection lens with a small projection ratio may adapt to a narrow space while ensuring the projection effect.

Figure 8:
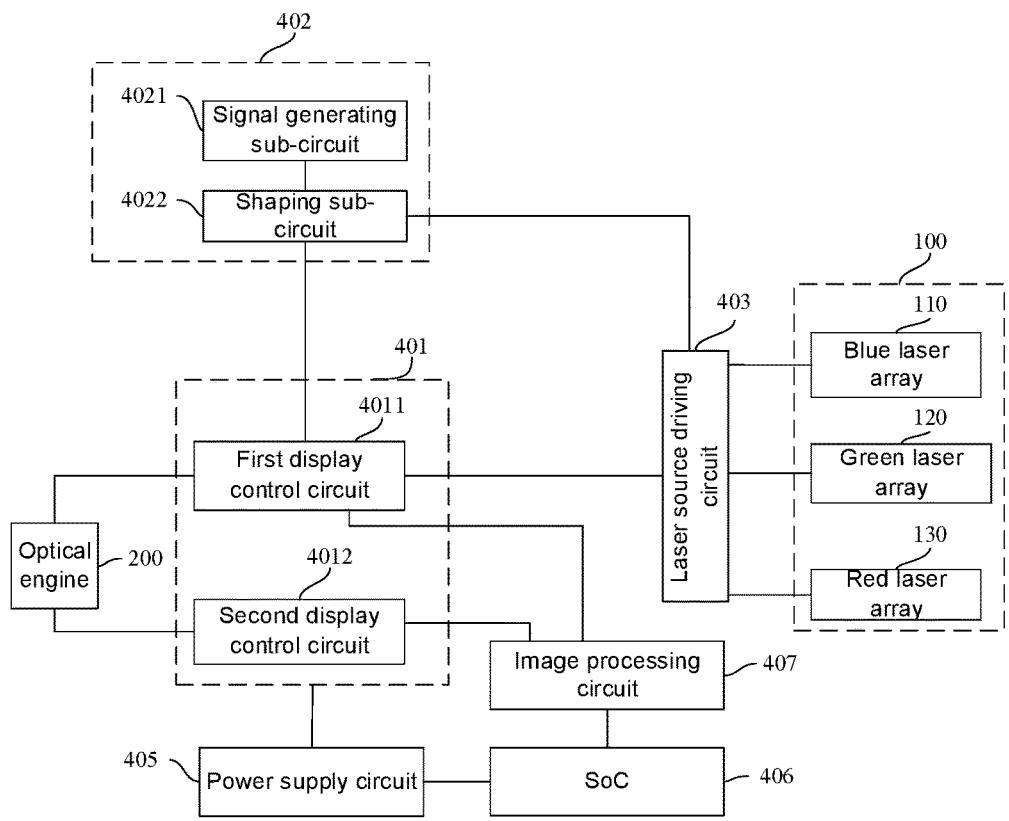
FIG. 8 is a structural diagram of another laser projection apparatus, in accordance with some embodiments of the present disclosure.
Figure 9:
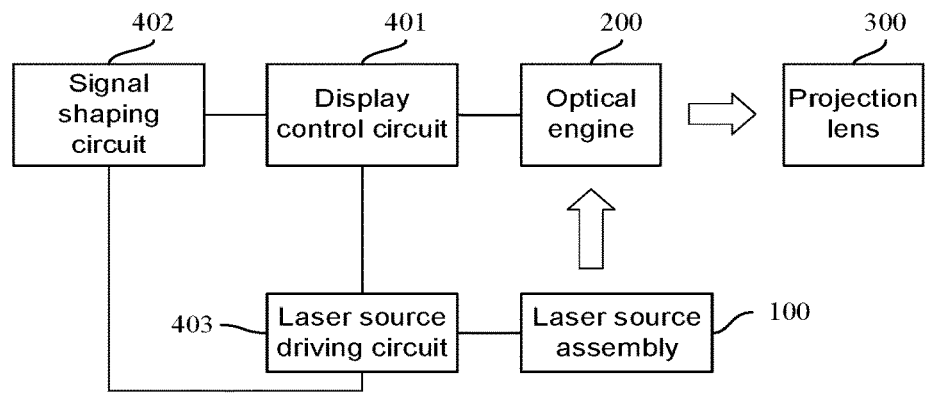
FIG. 9 is a structural diagram of yet another laser projection apparatus, in accordance with some embodiments of the present disclosure.

In some embodiments, as shown in FIGS. 8 and 9, the laser projection apparatus further includes a display control circuit 401, at least one signal shaping circuit 402 and at least one laser source driving circuit 403. The number of signal shaping circuits 402 and the number of laser source driving circuits 403 are related to the number of laser arrays included in the laser source assembly 100. In a case where the laser source assembly 100 includes a plurality of laser arrays, at least one laser array of the plurality of laser arrays is correspondingly provided with a signal shaping circuit 402 and a laser source driving circuit 403. The present disclosure does not limit the number of the signal shaping circuits 402 and the number of the laser source driving circuits 403.

In some embodiments, as shown in FIG. 8, the laser projection apparatus further includes a system on chip (SoC) 406. The SoC 406 is coupled to the display control circuit 401, and is configured to receive and decode external audio and video signals, and then transmit the video image signals obtained after decoding to the display control circuit 401. For example, the SoC 406 is configured to decode data in different data formats into data in a normalized format, and transmit the data in the normalized format to the display control circuit 401 through a connector.

For example, as shown in FIG. 8, the laser projection apparatus further includes an image processing circuit 407. The image processing circuit 407 is coupled to the display control circuit 401 and the SoC 406, and is configured to process the video image signals from the SoC 406 and transmit the video image signals obtained after processing to the display control circuit 401. The image processing manner may include: motion estimation and motion compensation (MEMC), image correction, etc., so as to enhance the image. For example, the image processing circuit 407 includes an algorithm processing module field programmable gate array (FPGA). In some embodiments, the laser projection apparatus may not include the algorithm processing module FPGA.

For example, as shown in FIG. 8, the laser projection apparatus further includes a power supply circuit 405, which is configured to supply power to part or all of components of the laser projection apparatus. In some embodiments, the power supply circuit 405 may supply a driving current of 2.9 ampere (A) to the red laser array 130, a driving current of 2 A to the green laser array 120, and a driving current of 3 A to the blue laser array 110.

For example, the display control circuit 401, the signal shaping circuit 402, the laser source driving circuit 403, the image processing circuit 407, the power supply circuit 405 and the SoC 406 may be disposed in a single circuit board, or may be disposed in a plurality of circuit boards. For example, in order to reduce the size of the laser projection apparatus, the signal shaping circuit 402 may be disposed in the display control circuit 401. In this case, the signal shaping circuit 402 may be a sub-circuit of the display control circuit 401. Alternatively, for example, the signal shaping circuit 402 is disposed in the laser source driving circuit 403. In this case, the signal shaping circuit 402 may be a sub-circuit of the laser source driving circuit 403. The present disclosure does not limit the specific locations of the display control circuit 401, the signal shaping circuit 402, the laser source driving circuit 403, the image processing circuit 407, the power supply circuit 405 and the SoC 406.

In some embodiments, the display control circuit 401 is coupled to the signal shaping circuit 402 and the laser source driving circuit 403, and is configured to output a first driving signal to the signal shaping circuit 402 and output a second driving signal to the laser source driving circuit 403. The first driving signal includes one of an enable signal and a current control signal, and the second driving signal includes another of the enable signal and the current control signal. For example, the display control circuit 401 includes a DLP chip, and further includes a driver chip. In the DLP control architecture, the laser source assembly 100 needs to match the operation timing of the DLP chip and the DMD chip. In a process that the DMD chip sequentially modulates image components of different primary colors, the laser source assembly 100 needs to synchronously output laser beams of corresponding primary colors.

Figure 10:
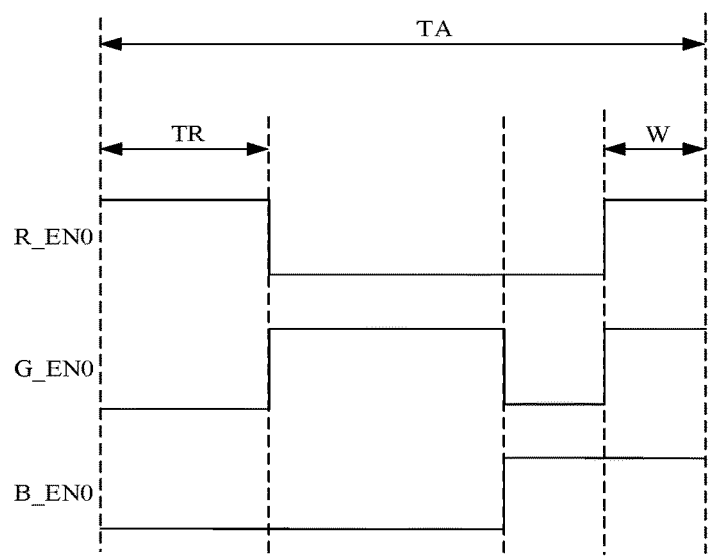
FIG. 10 is a diagram showing a driving timing of beams of three primary colors in a driving cycle of a laser projection apparatus, in accordance with some embodiments of the present disclosure.

The enable signal EN is a timing control signal used for adjusting the output timing of beams of different colors. Also referred to as a primary color enable signal or an image enable signal, the enable signal EN is usually denoted as X_EN, where X represents different primary colors. For example, referring to FIG. 10, the operation timing of driving the three primary colors in one cycle and the durations in which the lasers corresponding to the three primary colors are turned on in one cycle are described by taking an example where one driving cycle is TA, the active level is a high level, and the inactive level is a low level. Within one driving cycle TA, among three enable signals R_EN0, G_EN0 and B_EN0 corresponding to the three primary colors, only the enable signal of one primary color is in an active period (e.g., at a high level), and the enable signals of the other two primary colors are in an inactive period (e.g., at a low level). For example, in the period TR shown in FIG. 10, only the red enable signal R_EN0 is in the active period (e.g., at a high level), and the green enable signal G_EN0 and the blue enable signal B_EN0 are in the inactive period (e.g., at a low level). For example, the driving cycle TA may be ¹⁄₂₄₀s (e.g., 4.17 ms); that is, the frequency of the enable signal is 240 Hz.

In some embodiments, in order to increase the brightness of the image, in one driving cycle TA, it may be arranged that the three enable signals R_EN0, G_EN0 and B_EN0 corresponding to the three primary colors are active at the same time. In this case, the three primary colors may be output in a superimposed manner. For example, in the period W shown in FIG. 10, the red enable signal R_EN0, the green enable signal G_EN0 and the blue enable signal B_EN0 are all in the active period of a high level; then, in one driving cycle, the duration in which the red laser array 130 is turned on is a sum of TR and W (TR+W). The present disclosure does not limit the duration in which the three enable signals corresponding to the three primary colors are active at the same time. For example, there may not be a W period, and the laser beams are emitted only in a manner of emitting beams of three primary colors alternately. In this case, in one driving cycle TA, the duration in which the red laser array 130 is turned on is TR.

In some embodiments, the current control signal may also be referred to as a brightness adjustment signal. For example, the current control signal may be a pulse width modulation (PWM) signal. For example, the current control signal PWM is a square wave signal with a frequency of 18.3 KHZ. The display of a projection image requires synchronization of the laser source assembly 100 and the optical engine 200. In the process that the optical engine 200 modulates the image components of different primary colors, the laser source assembly 100 needs to synchronously output beams of corresponding primary colors. That is to say, the enable signal may be able to turn on a laser of a certain color in the laser source assembly 100, and the current control signal may be able to turn on a laser of a certain color in the laser source assembly 100 at a certain brightness.

In some embodiments, as shown in FIGS. 8 and 9, the display control circuit 401 is further configured to generate a modulated driving signal for driving the optical engine 200 according to a signal of an image signal of an image to be displayed. In some embodiments, as shown in FIG. 8, the display control circuit 401 includes a first display control circuit 4011 and a second display control circuit 4012, and the first display control circuit 4011 and the second display control circuit 4012 are coupled to the algorithm processing module FPGA (the FPGA being included in the image processing circuit 407) and optical engine 200. The first display control circuit 4011 is configured to output an enable signal and a current control signal to drive the laser source assembly 100. The second display control circuit 4012 is configured to generate a modulated driving signal according to a signal of an image signal of an image to be displayed to drive the optical engine 200. For example, the first display control circuit 4011 and the second display control circuit 4012 may be two DLP chips.

In some embodiments, as shown in FIG. 9, the signal shaping circuit 402 is coupled to the laser source driving circuit 403, and is configured to shape the first driving signal based on a shaping signal to obtain a target driving signal, and output the target driving signal to the laser source driving circuit 403. A frequency of the target driving signal is higher than a frequency of the first driving signal. For example, the frequency of the target driving signal is N times the frequency of the first driving signal, and N is greater than 5,000.

Figure 11:
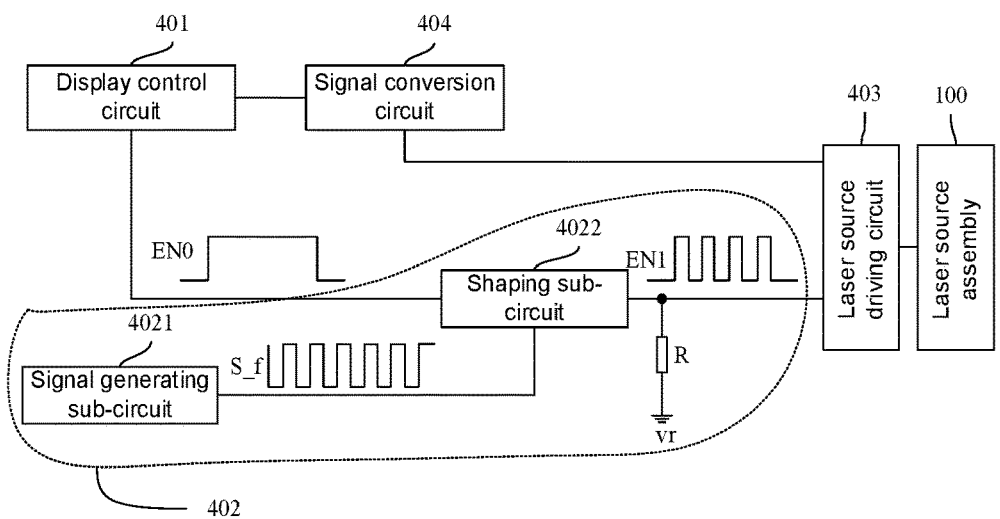
FIG. 11 is a structural diagram of a partial circuit of yet another laser projection apparatus, in accordance with some embodiments of the present disclosure.

In some embodiments, as shown in FIGS. 8 and 11, the signal shaping circuit 402 includes a signal generating sub-circuit 4021 and a shaping sub-circuit 4022. The signal generating sub-circuit 4021 is coupled to the shaping sub-circuit 4022, and is configured to generate the shaping signal S_f. The shaping sub-circuit 4022 is configured to receive the shaping signal S_f, and shape the first driving signal (e.g., an enable signal EN0) based on the shaping signal S_f to obtain the target driving signal EN1.

In some embodiments, as shown in FIG. 11, the signal shaping circuit 402 further includes a resistor R. The resistor R is coupled to the shaping sub-circuit 4022, the laser source driving circuit 403 and a reference power terminal vr. The reference power terminal vr may be a ground terminal (GND).

In some embodiments, as shown in FIG. 11, the laser projection apparatus further includes a signal conversion circuit 404. The signal conversion circuit 404 is coupled to the display control circuit 401 and the laser source driving circuit 403, and is configured to receive the current control signal from the display control circuit 401, convert the current control signal from the display control circuit 401 into an analog signal, and output the analog signal to the laser source driving circuit 403.

Figure 12:
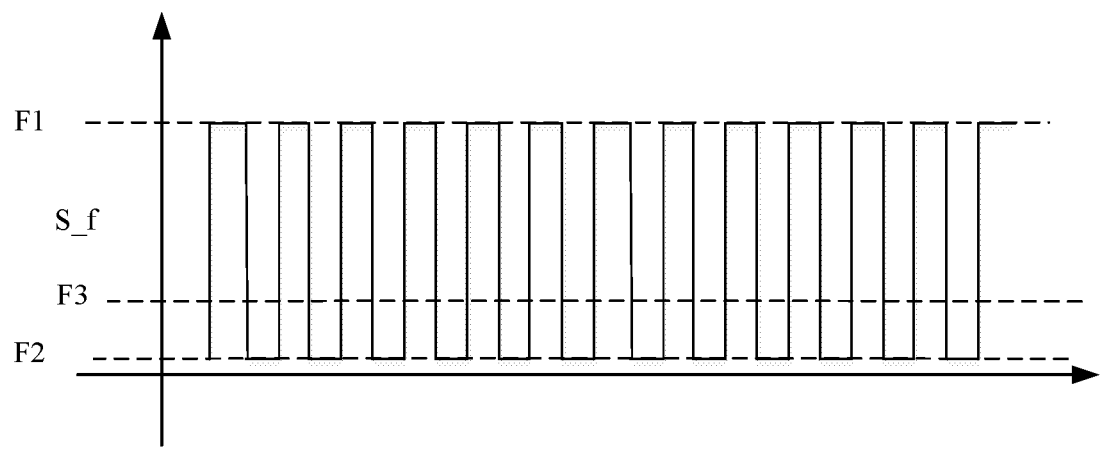
FIG. 12 is a waveform diagram of a shaping signal, in accordance with some embodiments of the present disclosure.
Figure 13:
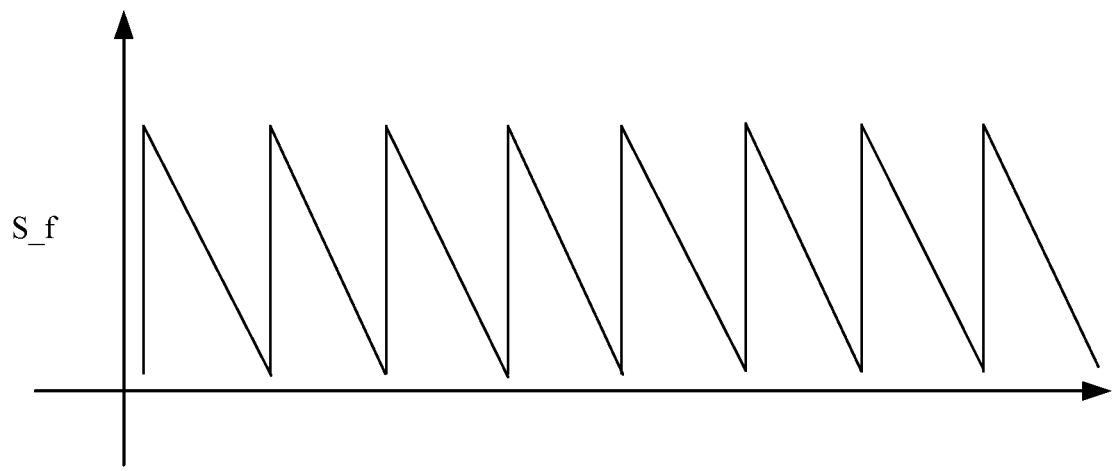
FIG. 13 is a waveform diagram of another shaping signal, in accordance with some embodiments of the present disclosure.
Figure 14:
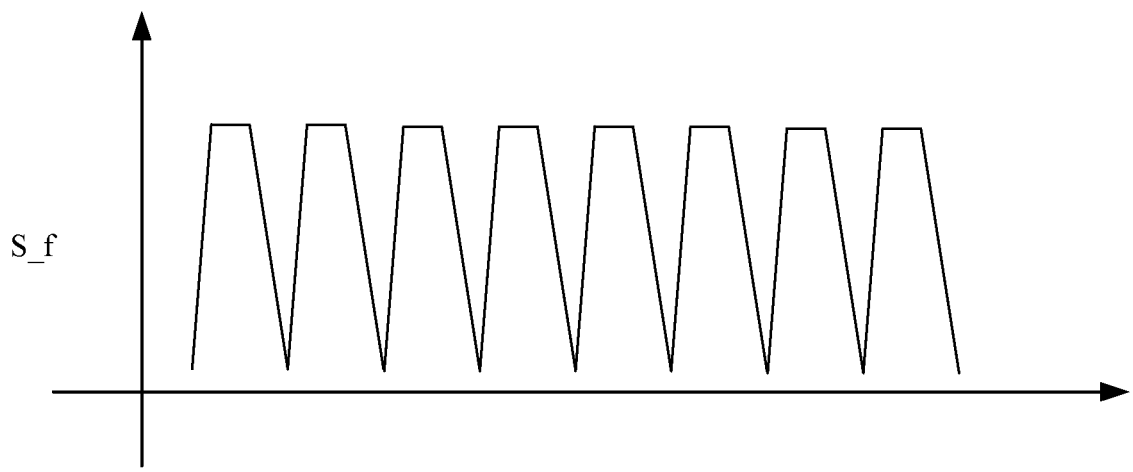
FIG. 14 is a waveform diagram of yet another shaping signal, in accordance with some embodiments of the present disclosure.

In some embodiments, as shown in FIG. 12, the shaping signal S_f generated by the signal generating sub-circuit 4021 is a periodic square wave signal. In the figure, the abscissa represents the time, and the ordinate represents the amplitude. F1 is the maximum amplitude, and F2 is the minimum amplitude. In each cycle, the waveform resembles a square. Alternatively, as shown in FIG. 13, the shaping signal S_f generated by the signal generating sub-circuit 4021 is a triangular wave signal. In the figure, the abscissa represents the time, and the ordinate represents the amplitude. In each cycle, the waveform resembles a triangle. Alternatively, as shown in FIG. 14, the shaping signal S_f generated by the signal generating sub-circuit 4021 is a sawtooth wave signal. In the figure, the abscissa represents the time and the ordinate represents the amplitude, and the waveform resembles a sawtooth. For example, the amplitude represented by the ordinate in FIGS. 12 to 14 is a voltage value.

In some embodiments, the shaping signal S_f is the periodic square wave signal as shown in FIG. 12, and a frequency of the periodic square wave signal is greater than or equal to 1 MHZ. The following embodiments are described by taking an example where the shaping signal S_f is a periodic square wave signal with a frequency greater than or equal to 1 MHZ.

Figure 15:
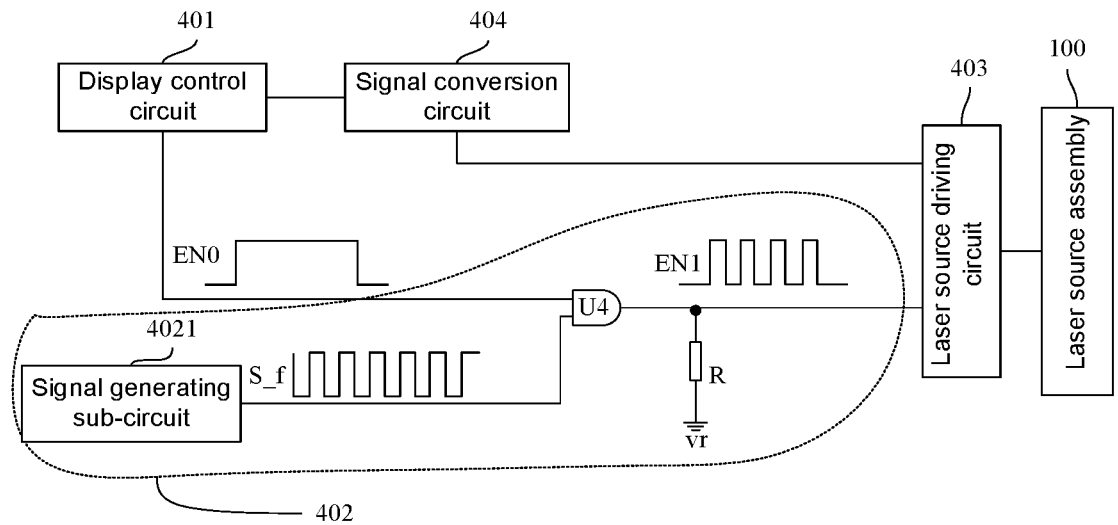
FIG. 15 is a structural diagram of a partial circuit of yet another laser projection apparatus, in accordance with some embodiments of the present disclosure.

In some embodiments, as shown in FIG. 15, the shaping sub-circuit 4022 includes a logic AND device U4. A first input terminal of the logic AND device U4 receives the first driving signal from the display control circuit 401. In an example where the first driving signal is the enable signal EN0, a second input terminal of the logic AND device U4 receives the shaping signal S_f from the signal generating sub-circuit 4021, and an output terminal of the logic AND device U4 outputs the target driving signal EN1 to the laser source driving circuit 403. A supply voltage of the logic AND device U4 may be equal to a supply voltage of the laser source driving circuit 403.

Figure 16:
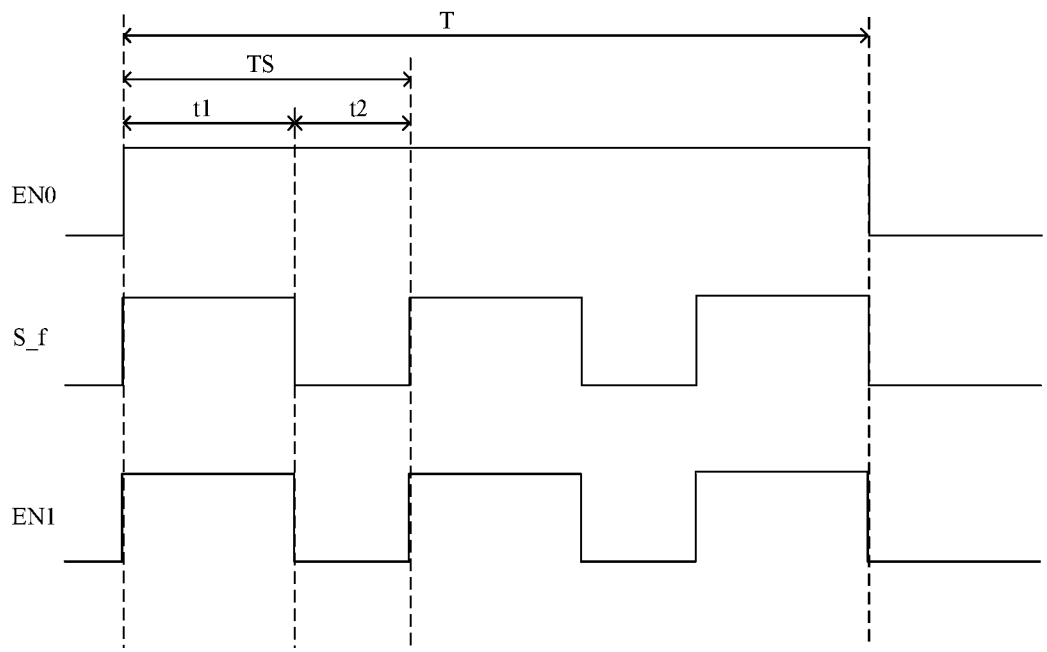
FIG. 16 is a waveform diagram of a first driving signal, a shaping signal and a target driving signal, in accordance with some embodiments of the present disclosure.

Referring to FIG. 16, an operation process of the logic AND device U4 within one cycle TS of the shaping signal S_f is described by taking an example where: in one driving cycle, a duration in which the enable signal EN0 is at a high level is T, a cycle of the shaping signal S_f is TS, and within one cycle TS of the shaping signal S_f, a duration in which the shaping signal S_f is at a high level is t1, and a duration in which the shaping signal S_f is at a low level is t2. In the duration t1, the enable signal EN0 is at a high level, and the shaping signal S_f is at a high level. Then, after the enable signal EN0 and the shaping signal S_f pass through the logic AND device U4, the logic AND device U4 outputs a target driving signal EN1 that is at a high level. In the duration t2, the enable signal EN0 is at a high level, and the shaping signal S_f is at a low level. Then, after the enable signal EN0 and the shaping signal S_f pass through the logic AND device U4, the logic AND device U4 outputs a target driving signal EN1 that is at a low level.

Figure 17:
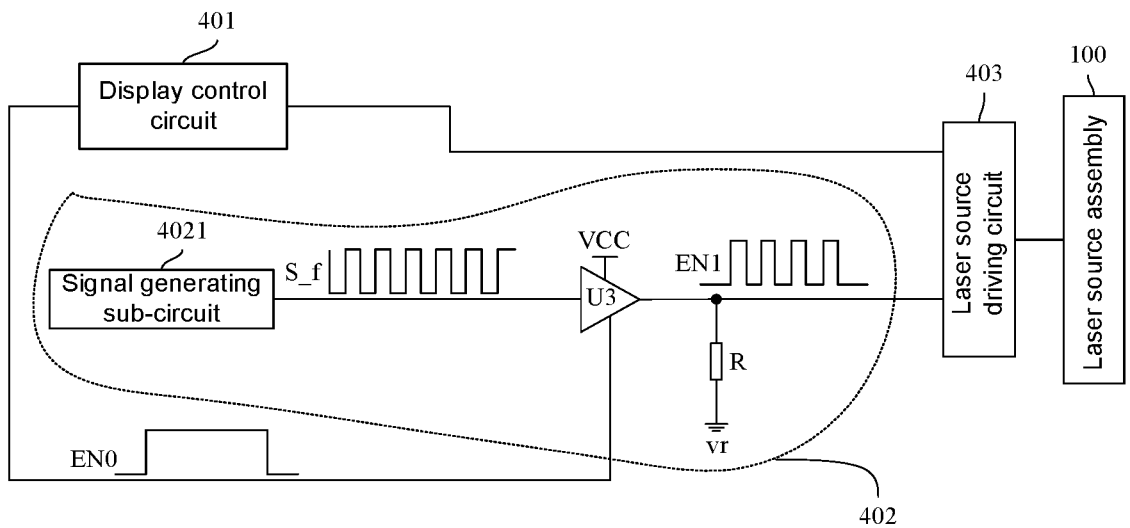
FIG. 17 is a structural diagram of a partial circuit of yet another laser projection apparatus, in accordance with some embodiments of the present disclosure.

In some embodiments, as shown in FIG. 17, the shaping sub-circuit 4022 includes a tristate buffer U3 coupled to a power supply VCC. A control terminal of the tristate buffer U3 receives the first driving signal, an input terminal of the tristate buffer U3 receives the shaping signal S_f, and an output terminal of the tristate buffer U3 outputs the target driving signal EN1. The enable signal EN0 may be used to control the tristate buffer U3 to be turned on or turned off. In one cycle TS of the shaping signal S_f, an operation process of the tristate buffer U3 is the same as that of the logic AND device U4, and details will not be repeated here.

Figure 18:
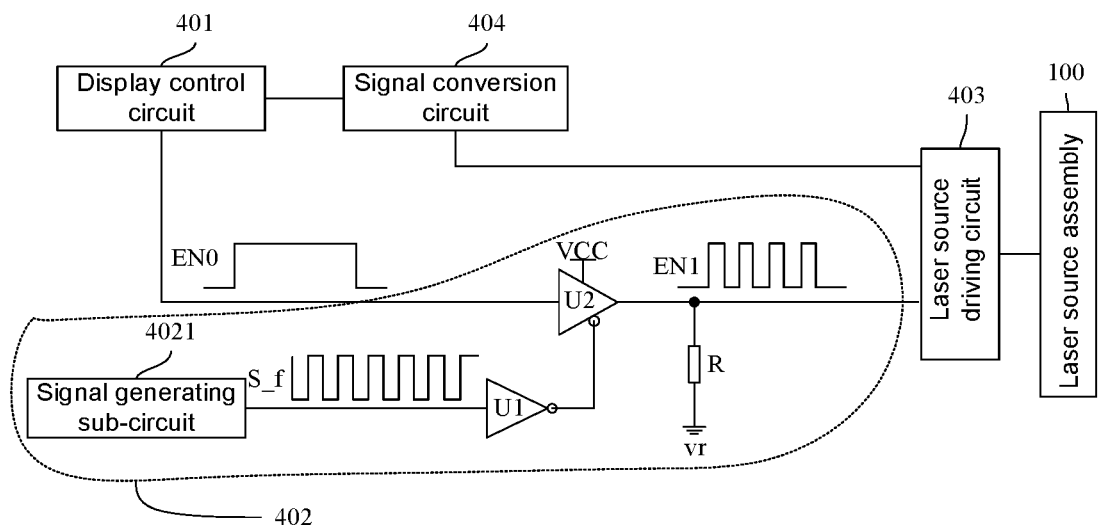
FIG. 18 is a structural diagram of a partial circuit of yet another laser projection apparatus, in accordance with some embodiments of the present disclosure.
Figure 20:
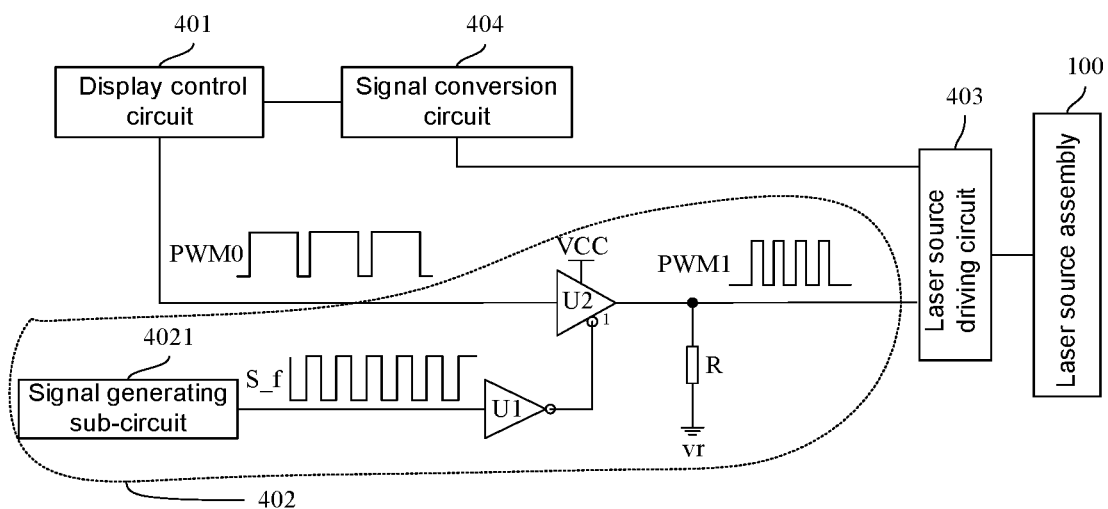
FIG. 20 is a structural diagram of a partial circuit of yet another laser projection apparatus, in accordance with some embodiments of the present disclosure.

In some embodiments, as shown in FIGS. 18 and 20, the shaping sub-circuit 4022 includes a tristate buffer U2. An input terminal of the tristate buffer U2 receives the first driving signal. In an example where the first driving signal is the enable signal EN0, a control terminal of the tristate buffer U2 receives the shaping signal S_f, and an output terminal of the tristate buffer U2 outputs the target driving signal EN1. The shaping signal S_f may be used to control the tristate buffer U2 to be turned on or turned off.

In some embodiments, as shown in FIGS. 18 and 20, the shaping sub-circuit 4022 further includes an inverter U1. The inverter U1 is coupled between the signal generating sub-circuit 4021 and the control terminal of the tristate buffer U2. The inverter U1 is configured to invert the shaping signal S_f to obtain an inverted shaping signal S_f1.

Figure 19:
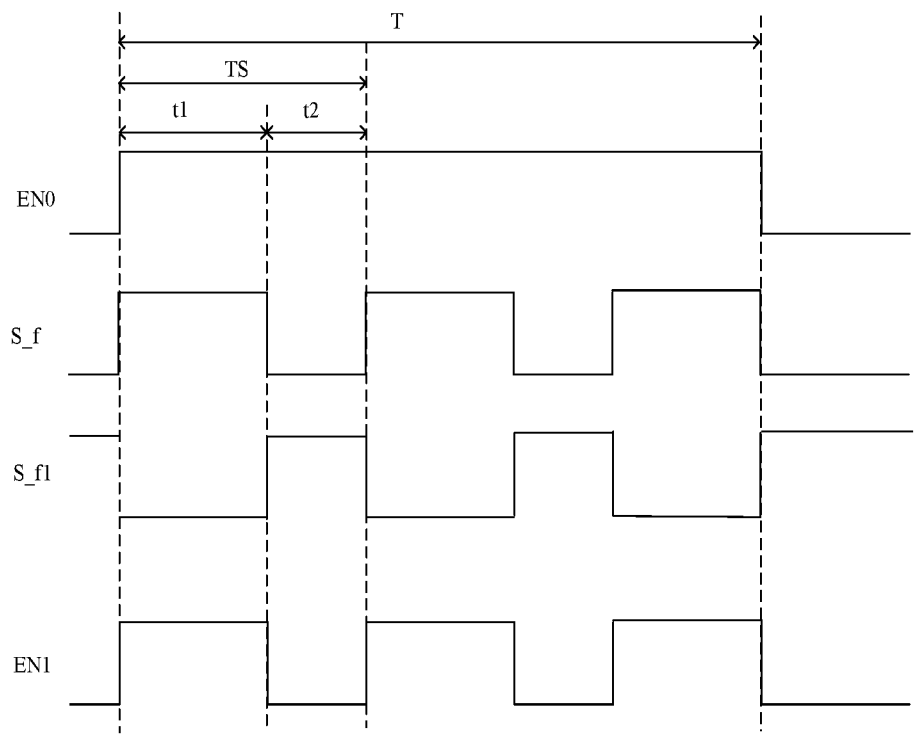
FIG. 19 is a waveform diagram of another first driving signal, a shaping signal and a target driving signal, in accordance with some embodiments of the present disclosure.

Referring to FIGS. 18 and 19, an operation process of the tristate buffer U2 within one cycle TS of the shaping signal S_f is described by taking an example where: the first driving signal is the enable signal EN0, the tristate buffer U2 is turned on when the inverted shaping signal S_f1 received by the control terminal of the tristate buffer U2 is at an inactive level, within one driving cycle, a duration in which the enable signal EN0 is at a high level is T, a cycle of the shaping signal S_f is TS, and in one cycle TS of the shaping signal S_f, a duration in which the shaping signal S_f is at a high level is t1, and a duration in which the shaping signal S_f is at a low level is t2. In the duration t1, the enable signal EN0 is at a high level, the shaping signal S_f is at a high level, and the inverted shaping signal S_f1 obtained by the inverter U1 is at a low level. At this time, the tristate buffer U2 is turned on after the control terminal of the tristate buffer U2 receives the low level of the inverted shaping signal S_f1, and a signal output by the output terminal of the tristate buffer U2 is an enable signal. That is, in a case where the enable signal EN0 is received by the input terminal of the tristate buffer U2, the tristate buffer U2 outputs a target driving signal EN1 that is at a high level. In the duration t2, the enable signal EN0 is at a high level, the shaping signal S_f is at a low level, and the inverted shaping signal S_f1 obtained by the inverter U1 is at a high level. At this time, the tristate buffer U2 is turned off after the control terminal of the tristate buffer U2 receives the high level of the inverted shaping signal S_f1, and a signal output by the output terminal of the tristate buffer U2 is at a low level. That is, the tristate buffer U2 outputs a target driving signal EN1 that is at a low level.

Figure 21:
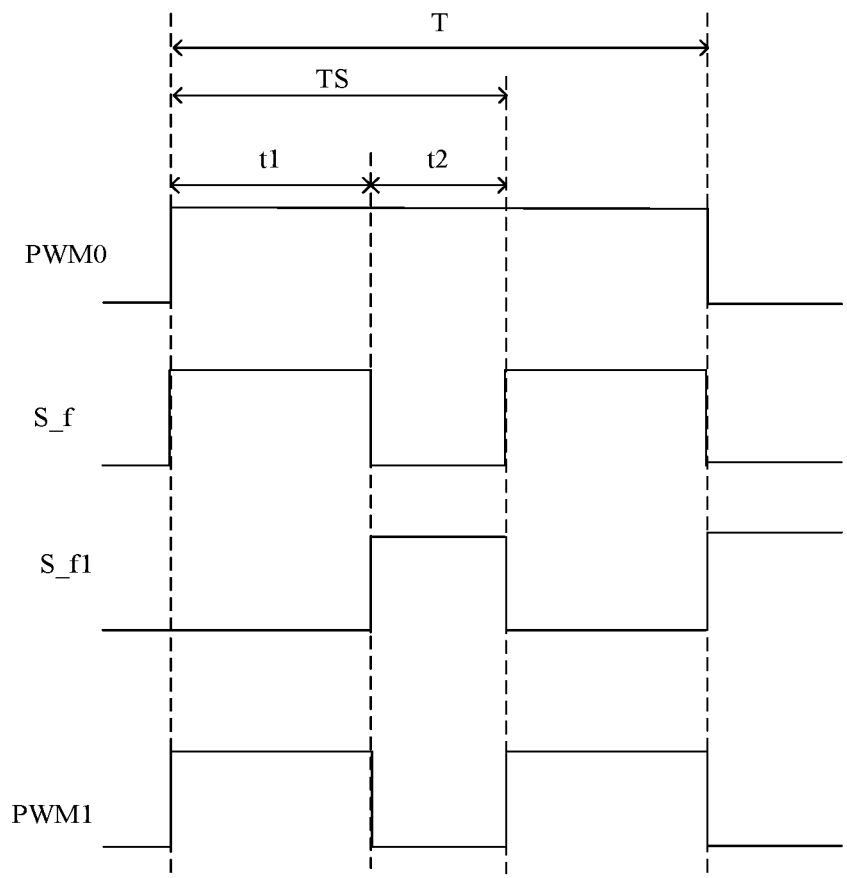
FIG. 21 is a waveform diagram of yet another first driving signal, a shaping signal and a target driving signal, in accordance with some embodiments of the present disclosure.

Referring to FIGS. 20 and 21, the operation process of the tristate buffer U2 within one cycle TS of the shaping signal S_f is described by taking an example where: the first driving signal is the current control signal PWM0, the tristate buffer U2 is turned on when the inverted shaping signal S_f1 received by the control terminal of the tristate buffer U2 is at an inactive level, in one cycle of the current control signal PWM0, a duration in which the current control signal PWM0 is at a high level is T0, a cycle of the shaping signal S_f is T1, and within one cycle TS of the shaping signal S_f, a duration in which the shaping signal S_f is at a high level is t1, and a duration in which the shaping signal S_f is at a low level is t2. In the duration t1, the current control signal PWM0 is at a high level, the shaping signal S_f is at a high level, and the inverted shaping signal S_f1 obtained by the inverter U1 is at a low level. At this time, the tristate buffer U2 may be turned on under control of the low level of the inverted shaping signal S_f1, and a signal output by the output terminal of the tristate buffer U2 is the current control signal PWM0 received by the input terminal of the tristate buffer U2. That is, the tristate buffer U2 outputs a target driving signal PWM1 that is at a high level. In the duration t2, the current control signal PWM0 is at a high level, the shaping signal S_f is at a low level, and the inverted shaping signal S_f1 obtained by the inverter U1 is at a high level. At this time, the tristate buffer U2 is turned off after the control terminal of the tristate buffer U2 receives the high level of the inverted shaping signal S_f1, and a signal output by the output terminal of the tristate buffer U2 is at a low level. That is, the tristate buffer U2 outputs a target driving signal PWM1 that is at a low level.

In some embodiments, as shown in FIG. 9, the laser source driving circuit 403 is coupled to the laser source assembly 100, and is configured to receive the second driving signal and the target driving signal, and drive the laser source assembly 100 to be turned on or turned off in response to the second driving signal and the target driving signal. For example, as shown in FIGS. 2A and 8, in an example where the laser source assembly 100 includes three groups of lasers (for example, the three groups of lasers are the blue laser array 110, the green laser array 120 and the red laser array 130), each group of lasers is correspondingly provided with a signal shaping circuit 402 and a laser source driving circuit 403.

In some embodiments, the number of signal shaping circuits 402 may be one or more. For example, in a case where there is only one signal shaping circuit 402, the one signal shaping circuit 402 may be coupled to the display control circuit and one of the blue laser array 110, the green laser array 120 or the red laser array 130. For example, referring to FIGS. 22A, 22B and 22C, the operation processes of the display control circuit 401, the signal shaping circuit 402, the laser source driving circuit 403 and respective groups of lasers in the laser source assembly 100 are described by taking an example where the signal shaping circuit 402 is coupled to the display control circuit 401 and the laser source driving circuit 403 corresponding to the red laser array 130 to shape the enable signal of the red laser array 130.

Figure 22A:
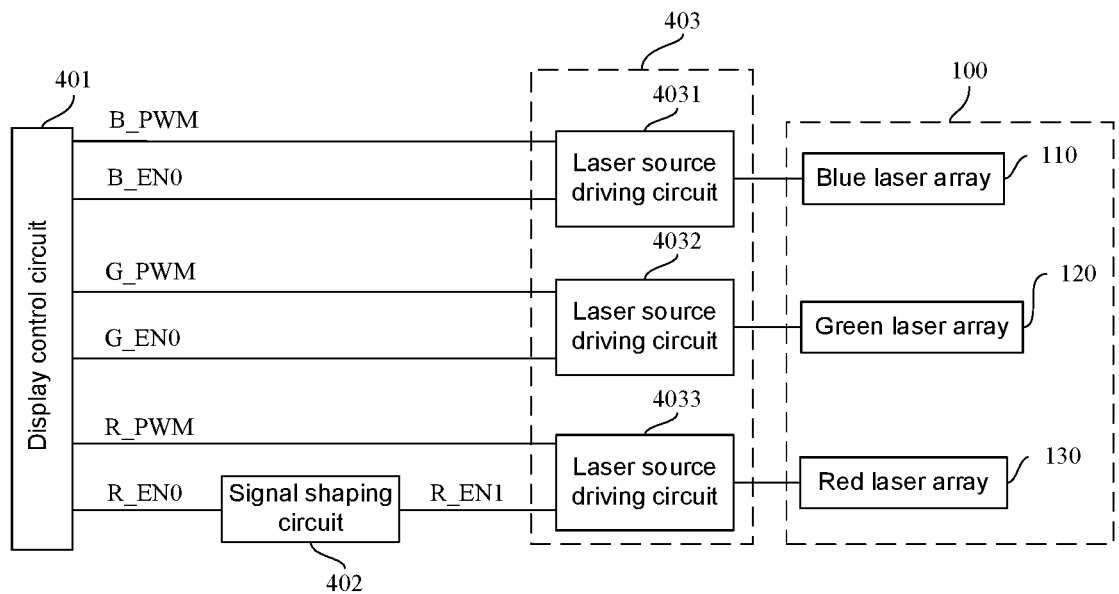
FIG. 22A is a structural diagram of a partial circuit of a laser projection apparatus, in accordance with some embodiments of the present disclosure.

Referring to FIG. 22A, since a process of driving the green laser array 120 to emit green laser beams is similar to a process of driving the blue laser array 110 to emit blue laser beams, the process of driving the blue laser array 110 to emit blue laser beams is taken as an example for illustration. Based on the duration in which the blue laser array 110 is turned on in the driving cycle, the display control circuit 401 outputs the blue enable signal B_EN0 corresponding to the blue laser array 110, and transmits the blue enable signal B_EN0 to the laser source driving circuit 403 corresponding to the blue laser array 110. At the same time, based on the blue primary color component of the image to be displayed, the display control circuit 401 outputs the blue current control signal B_PWM corresponding to the blue laser array 110, and transmits the blue current control signal B_PWM to the laser source driving circuit 403 corresponding to the blue laser array 110. In response to the enable signal B_EN0 and the target driving signal B_PWM, and based on the enable signal B_EN0 and the target driving signal B_PWM, the laser source driving circuit 403 corresponding to the blue laser array 110 obtains a blue driving current. The laser source driving circuit 403 corresponding to the blue laser array 110 outputs the blue driving current to the blue laser array 110, and the blue laser array 110 is driven by the driving current to emit blue laser beams.

Referring to FIG. 22A, based on the duration in which the red laser array 130 is turned on in the driving cycle, the display control circuit 401 outputs the enable signal R_EN0 corresponding to the red laser array 130, and transmits the red enable signal R_EN0 to the signal shaping circuit 402. The signal shaping circuit 402 shapes the first driving signal, i.e., the red enable signal R_EN0, to obtain the target driving signal R_EN1. The signal shaping circuit 402 outputs the target driving signal R_EN1 to the laser source driving circuit 403 corresponding to the red laser array 130. At the same time, based on a red primary color component of the image to be displayed, the display control circuit 401 outputs the second driving signal, i.e., the red current control signal R_PWM corresponding to the red laser array 130, and transmits the red current control signal R_PWM to the laser source driving circuit 403 corresponding to the red laser array 130.

Figure 22B:
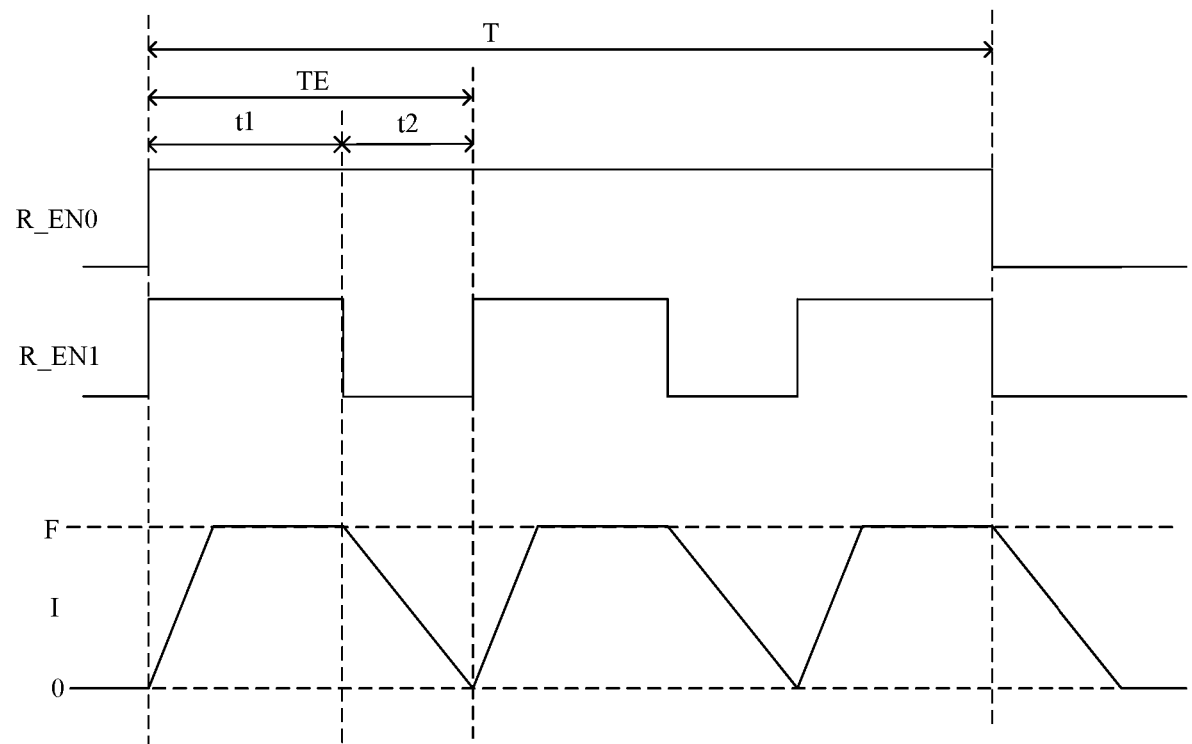
FIG. 22B is a waveform diagram of a first driving signal, a target driving signal and a driving current of a laser, in accordance with some embodiments of the present disclosure.
Figure 23:
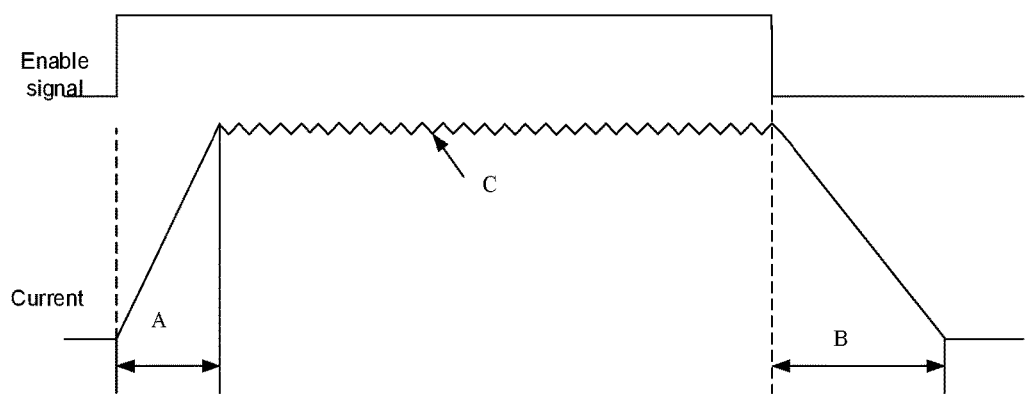
FIG. 23 is a waveform diagram of an enable signal and a driving current of a laser, in accordance with some embodiments of the present disclosure.

For example, referring to FIG. 22B, changes of the driving current flowing to the red laser array 130 is described by taking an example where: in one driving cycle, a duration in which the red enable signal R_EN0 is at a high level is T, a cycle of the target driving signal R_EN1 is TE, and in the cycle TE, a duration in which the target driving signal R_EN1 is at a high level is t1, and a duration in which the target driving signal R_EN1 is at a low level is t2. In one cycle of the target driving signal R_EN1, in the duration t1, the target enable signal R_EN1 is at a high level; then, in response to the current control signal, the laser source driving circuit 403 corresponding to the red laser array 130 may control the driving current transmitted to the red laser array 130 to increase from 0 to the target driving current F and remain constant at the target driving current F. In the duration t2, the target driving signal R_EN1 jumps from a high level to a low level, and in response to the current control signal, the laser source driving circuit 403 corresponding to the red laser array 130 may control the driving current transmitted to the red laser array 130 to decrease from the target driving current F to 0. As shown in FIG. 23, in an example where a time for the driving current transmitted to the red laser array 130 to increase from 0 to the target driving current F is A, and a time for the driving current transmitted to the red laser array 130 decreases from the target driving current F to 0 is B, A and B are related to relevant parameters (such as an image refresh rate) involving the display effect of the laser projection apparatus. For a laser projection apparatus in which the laser source assembly 100 includes lasers of three primary colors, the condition that both A and B are greater than or equal to 0 microseconds (μs) and less than or equal to 19 μs (0 μs≤A≤19 μs and 0 μs≤B≤19 μs) needs to be met to ensure a good display effect. The following embodiments are described by taking an example where both A and B are equal to 0 μs.

Figure 22C:
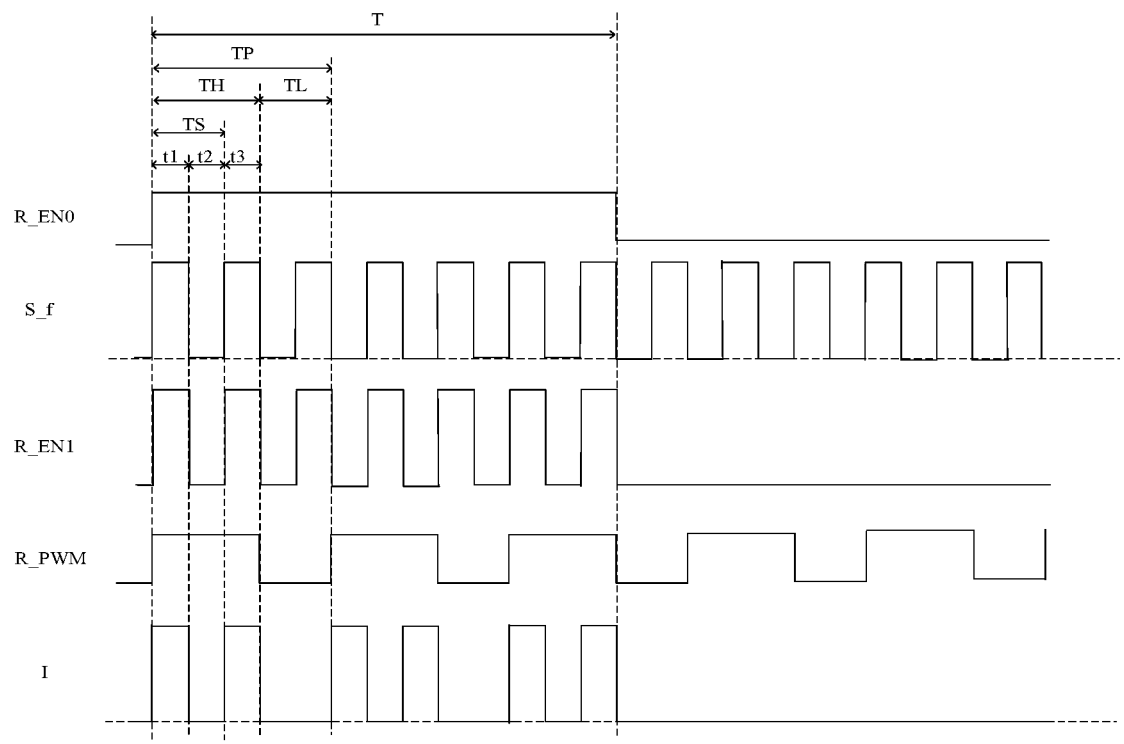
FIG. 22C is a waveform diagram of a first driving signal, a second driving signal, a shaping signal, a target driving signal and a driving current of a laser, in accordance with some embodiments of the present disclosure.

For example, as shown in FIG. 22C, a relationship among the enable signal, the current control signal, the shaping signal and the target driving signal is described by taking an example where: in one driving cycle, a duration in which the red enable signal R_EN0 is at a high level is T, a cycle of the red current control signal R_PWM is TP, in the cycle TP, a duration in which the red current control signal R_PWM is at a high level is TH, a duration in which the red current control signal R_PWM is at a low level is TL, a cycle of the shaping signal S_f is TS, and in the cycle TS, a duration in which the shaping signal S_f is at a high level is t1, a duration in which the shaping signal S_f is at a low level is t2, t1 is equal to t2 (t1=t2), and TH is 3 times t1 (TH=3*t1). In the duration T, the red enable signal R_EN0 is at a high level, and the signal shaping circuit 402 shapes the red enable signal R_EN0 based on the shaping signal S_f. That is, the signal shaping circuit 402 superimposes the shaping signal S_f and the red enable signal R_EN0 to form the target driving signal R_EN1. In the duration T, with TS as a cycle, the target driving signal R_EN1 maintains at a high level for a duration t1, and then switches to a low level and maintains at the low level for a duration t2 within one cycle TS. When the red enable signal R_EN0 is at a low level, the target driving signal R_EN1 is also at a low level.

As shown in FIG. 22C, the display control circuit 401 outputs the red current control signal R_PWM with a cycle of TP at the time of outputting the red enable signal R_EN0. The laser source driving circuit 403 drives the red laser array 130 to be turned on or turned off in response to the target driving signal R_EN1 and the red current control signal R_PWM. That is, the laser source driving circuit 403 superimposes the target driving signal R_EN1 and the red current control signal R_PWM to obtain the driving current I of the red laser array 130. In the cycle TP, a duration in which the red current control signal R_PWM is at a high level is TH. In the duration TH, durations in which the target driving signal R_EN1 is at a high level are the duration t1 and the duration t3 (for example, t3 is equal to t1), and a duration in which the target driving signal R_EN1 is at a low level is the duration t2. Therefore, in the duration TH, durations in which the driving current I of the red laser array 130 is at a high level are the duration t1 and the duration t3, and a duration in which the driving current I of the red laser array 130 is at a low level is the duration t2. In the cycle TP, a duration in which the red current control signal R_PWM is at a low level is TL, and a duration in which the driving current I of the red laser array 130 is at a low level is TL. Therefore, a waveform diagram of the driving current I of the red laser array 130 as shown in FIG. 22C is obtained. It can be seen that the driving current I of the red laser array 130 has a waveform composed of a plurality of high levels and low levels that are arranged alternately and are of short durations.

In some embodiments, as shown in FIG. 12, amplitudes of the shaping signal S_f includes a first amplitude F1 and a second amplitude F2. When a value of the shaping signal is the first amplitude F1, the laser is turned on. When the value of the signal S_f is the second amplitude F2, the laser is turned off. In some embodiments, the first amplitude of the shaping signal S_f may be a lowest value of the shaping signal S_f, or may be a highest value of the shaping signal S_f. The present disclosure is described by taking an example where the first amplitude of the shaped signal S_f is the highest value. Herein, an example is taken where a corresponding driving current of the red laser array 130 is a highest value Imax when the shaping signal S_f is the first amplitude, a corresponding driving current of the red laser array 130 is a lowest value Imin when the shaping signal S_f is the second amplitude, and a threshold current of turning on the red laser array 130 is F3, and F3 is greater than Imin and less than Imax (Imin<F3<Imax). After the driving current output to the red laser array 130 is shaped by the shaping signal S_f, the minimum value Imin of the driving current output to the red laser array 130 is smaller than the threshold current F3 of turning on the red laser array 130, and the maximum value Imax thereof is greater than the threshold current F3 of turning on the red laser array 130. Therefore, when the driving current I output to the red laser array 130 is at a high level, the red laser array 130 is turned on; and when the driving current I output to the red laser array 130 is at a low level, the red laser array 130 is turned off. In this way, the lasers may frequently switch between an on state and an off state.

Therefore, in one driving cycle, the laser source driving circuit 403 corresponding to the red laser array 130 may control the driving current of the red laser array 130 to change continuously, and the cycle of the driving current is equal to or approximately equal to the change cycle of the target driving signal R_EN1. In this way, the red laser array 130, driven by the driving current that changes periodically, may emit red laser beams of different wavelengths.

Figure 22D:
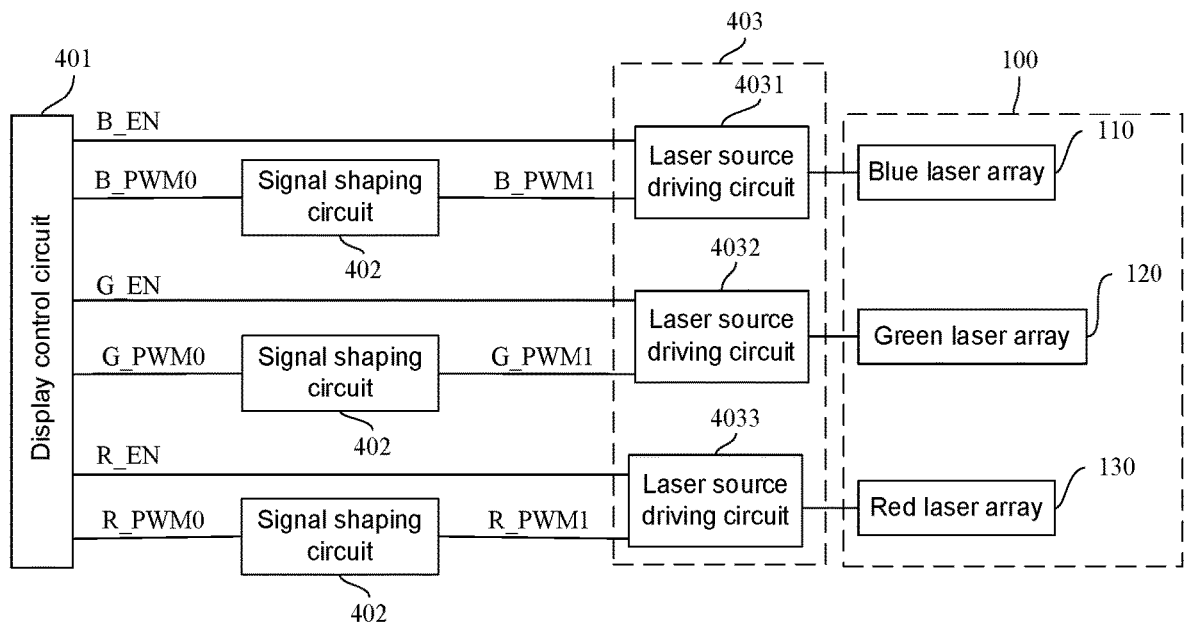
FIG. 22D is a structural diagram of a partial circuit of another laser projection apparatus, in accordance with some embodiments of the present disclosure.

In some embodiments, there are a plurality of signal shaping circuits 402. For example, there are three signal shaping circuits 402. Referring to FIG. 22D, a signal transmission process of the display control circuit 401, the signal shaping circuit 402, the laser source driving circuit 403 and three groups of lasers is described by taking an example where the three signal shaping circuits 402 are respectively coupled to the display control circuit 401 and the laser source driving circuit 403 corresponding to the three groups of lasers, and the current control signals of the three groups of lasers are shaped.

Referring to FIG. 22D, since a process of driving the green laser array 120 to emit laser beams, a process of driving the red laser array 130 to emit laser beams and a process of driving the blue laser array 110 to emit laser beams are similar, the process of driving the blue laser array 110 to emit laser beams is taken as an example for illustration. Based on the blue primary color component of the image to be displayed, the display control circuit 401 outputs the blue current control signal B_PWM0 corresponding to the blue laser array 110, and transmits the first driving signal, i.e., the blue current control signal B_PWM0, to the signal shaping circuit 402. The signal shaping circuit 402 shapes the blue current control signal B_PWM0 to obtain the target driving signal B_PWM1, and outputs the target driving signal B_PWM1 to the laser source driving circuit 403 corresponding to the blue laser array 110. The blue laser array 110 may be driven the target driving signal B_PWM1 to emit laser beams. At the same time, based on the duration in which the blue laser array 110 is turned on in the driving cycle, the display control circuit 401 outputs the second driving signal, i.e., the blue enable signal B_EN corresponding to the blue laser array 110, and transmits the blue enable signal B_EN to the laser source driving circuit 403 corresponding to the blue laser array 110. In response to the enable signal B_EN and the target driving signal B_PWM1, and based on the enable signal B_EN and the target driving signal B_PWM1, the laser source driving circuit 403 corresponding to the blue laser array 110 obtains a blue driving current. The laser source driving circuit 403 corresponding to the blue laser array 110 outputs the blue driving current to the blue laser array 110, and the blue laser array 110 is driven by the driving current to emit laser beams.

Referring to FIGS. 22A to 22D, in the process that the first driving signal output by the display control circuit 401 is shaped to obtain the target driving signal, and the target driving signal is transmitted to a corresponding laser source driving circuit 403 to drive a corresponding laser to emit beams, the frequency of the shaping signal is higher than the frequency of the first driving signal. Therefore, in one driving cycle, the laser source driving circuit 403 may change the driving current supplied to the laser, thereby changing wavelengths of laser beams emitted by the laser, reducing coherence of the laser beams, and achieving speckle reduction from the source.

In addition, the distribution of intensities of any speckle pattern on the projection screen is an accumulation of light flux within a certain period of time. The distribution of intensities of any two speckle patterns on the projection screen may be expressed as p1 (x1, y1) and p2 (x2, y2). Herein, (x1, y1) represents a position of one speckle pattern of the any two speckle patterns on the projection screen, and (x2, y2) represents a position of another speckle patterns of the any two speckle patterns on the projection screen.

An autocorrelation function of intensity distribution is: G(x1, y1; x2, y2)=<p1(x1, y1), p2(x2, y2)>. Herein, < > is a calculation of a statistical average value; an average value of intensity distribution satisfies a formula (1):

$$<p> = \frac{1}{N}\sum_{i=1}^{N} p(xi, yi), \quad (1)$$

where N is the number of speckle patterns on the projection screen, N is a positive integer greater than 0, (xi, yi) represents a position of an i-th speckle pattern in N speckle patterns on the projection screen, and i is a positive integer not greater than N. According to the diffraction theory and normalization, a formula (2) may be obtained:

$$\frac{G(\Delta x, \Delta y)}{<p>^2} = 1 + \frac{1}{e^{\frac{\Delta x^2 + \Delta y^2}{s^2}}}, \quad (2)$$

where $\Delta x$ and $\Delta y$ represents a correlation between the N speckle patterns. An average radius R of a laser speckle satisfies a formula (3):

$$R = \frac{\lambda z}{\pi S}, \quad (3)$$

where $\pi$ is approximately equal to 3.14, $\lambda$ is a wavelength of a laser beam, S is an average radius of a laser Gaussian spot on the projection screen, z is a distance between the projection screen and a viewing position, and both $\lambda$ and z are greater than 0.

According to the formula (2) and formula (3), the average radius S of the laser Gaussian spot is negatively correlated with the average value <p> of the intensity distribution, and the average radius R of the speckle pattern is negatively correlated with the average radius S of the laser Gaussian spot. That is, when the brightness at a certain position on the projection screen decreases, the average value of the intensity distribution at the position <p> becomes smaller, the average radius S of the corresponding laser Gaussian spot becomes larger, and the average radius R of the speckle pattern becomes smaller. The smaller the radius of the speckle pattern, the less effect the speckle pattern has on the displayed projection image, and the less noticeable the speckle pattern is. Therefore, since the laser projection apparatus provided by some embodiments of the present disclosure changes the driving current of the laser, the brightness of the laser beams emitted by the laser changes. In this way, it may be possible to reduce the average radius of the speckle pattern on the projection screen, and thus further achieve speckle reduction.

In some embodiments, within one cycle of the first driving signal, a total duration in which the target driving signal is at an active level is less than a duration in which the first driving signal is at an active level. For example, as shown in FIGS. 16 and 19, within one driving cycle of the first driving signal, i.e., the enable signal EN0, the duration in which the first driving signal is at an active level is T. Obviously, the total duration in which the target driving signal is at an active level is less than T. For example, as shown in FIG. 21, within one cycle of the first driving signal, i.e., the current control signal PWM0, the duration in which the first driving signal is at an active level is T. Obviously, the total duration in which the target driving signal is at an active level is less than T.

In some embodiments, the frequency of the periodic square wave signal is greater than or equal to 100 MHz, and the frequency of the target driving signal is less than or equal to the frequency of the shaping signal. Based on the operation principle of the semiconductor laser shown in FIG. 2B, a periodic square wave signal is provided to shape the first driving signal, so that the laser is turned on and off frequently. When the frequency of the driving current of the laser surpasses 100 Mhz (for example, reaches 200 Mhz), the laser is prone to be in an unstable state or a state that has not yet reached a steady state. In this state, the laser beam emitted by the laser is not a single-wavelength laser beam emitted by the laser when the laser is in a steady state, but a laser beam with a plurality of wavelengths. Therefore, the spectrum of the beams emitted by the laser becomes wider. Compared with a laser beam with a single wavelength, a laser beam with a plurality of wavelengths has a lower coherence. Moreover, by setting the frequency of the target driving signal is to be equal to or approximately equal to the frequency of the shaping signal S_f, it may be possible to effectively prevent the inductance and capacitance around the laser source driving circuit 403 from generating noise audible to the human ear when the frequency of the target driving signal is lower than 200 KHz.

In some embodiments, the duration in which the periodic square wave signal is at an inactive level in each cycle is a first duration. The first period is less than or equal to a first duration threshold and greater than or equal to a second duration threshold. The first duration threshold is a duration required for a driving current supplied by the laser source driving circuit to the laser source assembly to decrease from a target driving current to 0 (zero). The target driving current is a maximum driving current corresponding to the current control signal. The second duration threshold is a product of the first duration threshold and a target value. The target value is greater than 0 and less than or equal to 0.1.

For example, as shown in FIG. 23, the range of the frequency f of the periodic square wave signal, the duration ton in which the periodic square wave signal is at a high level and the duration toff in which the periodic square wave signal is at a low level in each cycle are described by taking an example where the first driving signal is an enable signal. When the enable signal EN jumps from a low level to a high level, the laser source driving circuit 403 transmits the driving current to the corresponding laser in response to the enable signal EN. The driving current transmitted by the laser source driving circuit 403 to the laser is not increased from 0 to the target driving current F instantaneously, but within a certain rising duration. Assuming that the rising duration is A, in order to ensure consistent reset of a plurality of micromirrors 2401 in the DMD 240, the rising duration A needs to meet a condition that A is greater than or equal to 0 µs and less than or equal to 19 µs (0 µs≤A≤19 µs). When the enable signal EN jumps from a high level to a low level, the laser source driving circuit 403 stops transmitting the driving current to the laser in response to the enable signal EN. Similarly, the driving current transmitted by the laser source driving circuit 403 to the laser does not decrease from the target driving current F to 0 instantaneously, but within a certain falling duration. Assuming that the falling duration is B, in order to ensure the consistent reset of the plurality of micromirrors 2401 in the DMD 240, the falling duration B needs to meet a condition that B is greater than or equal to 0 µs and less than or equal to 19 µs (0 µs≤B≤19 µs). In addition, during the projection process, a voltage ripple of the display control circuit 401 causes the driving current supplied by the laser source driving circuit 403 to the laser to fluctuate, thereby generating a current ripple C. In order to ensure consistent reset of the plurality of micromirrors 2401 in the DMD 240, the maximum value of the current ripple C needs to be kept within a range m, where m is [−10%×F, 10%×F], and the frequency of the current ripple C needs to be greater than 250 KHz. If the plurality of micromirrors 2401 in the DMD 240 are reset in unison, the projection times of the laser beams of different primary colors will be more consistent, and the display effect of the projected image will be better.

In a case where A and B meet the conditions of 0 µs≤A≤19 µs and 0 µs≤B≤19 µs, and the maximum value of the current ripple C is within the fluctuation range m, the laser projection apparatus may operate normally. Therefore, in order to achieve speckle reduction, the conditions of 0 µs≤A≤19 µs and 0 µs≤B≤19 µs need to be met, and the maximum current value of the current ripple C need to be kept within the fluctuation range m, so as to ensure that a brightness loss of the laser is small.

Figure 24:
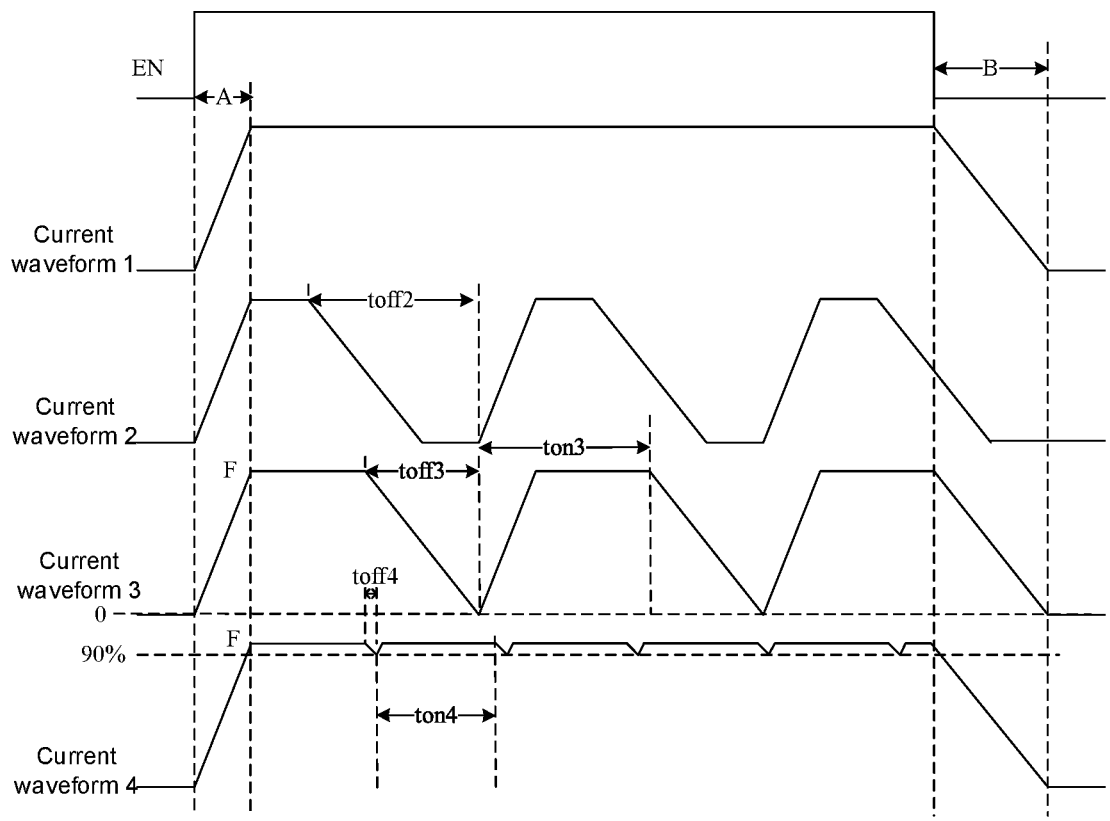
FIG. 24 is a waveform diagram of different driving currents corresponding to different shaping signals, in accordance with some embodiments of the present disclosure.

For example, as shown in FIG. 24, the current waveform 1 is the waveform of the driving current transmitted by the laser source driving circuit 403, in response to the enable signal EN, to the laser, in a case where the laser projection apparatus is not provided with a signal shaping circuit 402. The current waveform 1 is a continuous waveform, and the driving current is a constant current. In this case, it is difficult to reduce the speckle phenomenon of the laser projection apparatus, which is driven by the constant driving current.

For example, as shown in FIG. 24, the current waveform 2, the current waveform 3, and the current waveform 4 are all waveforms of the driving current transmitted by the laser source driving circuit 403, in response to the target driving signal, to the laser, in a case where the laser projection apparatus is provided with a signal shaping circuit 402, and the signal shaping circuit 402 shapes the enable signal EN based on the shaping signal S_f, i.e., the periodic square waveform, to obtain the target driving signal.

For example, as shown in FIG. 24, in the current waveform 2, within the duration toff2, the driving current provided by the laser decreases from the target driving current F to 0, and is kept at 0 for a period of time. That is, the laser is turned off for a period of time. Therefore, in a case where the waveform of the driving current is the current waveform 2, the speckle may be reduced. In the current waveform 3, within the duration toff3, the driving current of the laser decreases from the target driving current F to 0. After that, the driving current increases immediately until it reaches the target driving current F. The driving current of the current waveform 3 changes rather sharply. In a case where the waveform of the driving current is the current waveform 3, the brightness loss of the displayed projection image may be small, and the speckle may be reduced. In the current waveform 4, within the duration toff4, the driving current of the laser decreases from the target driving current F to 90% of the target driving current F. In this case, the driving current of the laser changes slightly, and the brightness loss of the displayed projection image is small. Correspondingly, the displayed projection image has a high brightness, and the speckle may be reduced. Since the maximum value of the current ripple C cannot be greater than 10% of the target driving current F, the reduced driving current needs to be less than or equal to 90% of the target driving current I.

It can be seen from the above analysis that, compared with current waveform 3 and current waveform 4, the average driving current of the laser in current waveform 2 is lower, the brightness of the image projected and displayed by the driving current is lower, and the brightness loss of the projected image is larger. Therefore, a good projection effect may not be guaranteed. In a case where the current waveform of the driving current of the laser is between the current waveform 3 and the current waveform 4, it may not only be possible to ensure that the brightness loss of the projection image is small, but it may also be possible to achieve speckle reduction. Therefore, the duration toff in which the periodic square wave signal is at an inactive level in each cycle needs to satisfy that: toff4 toff toff3, and the duration ton in which the periodic square wave signal is at an active level in each cycle needs to satisfy that: ton4≤ton≤ton3.

Figure 25:
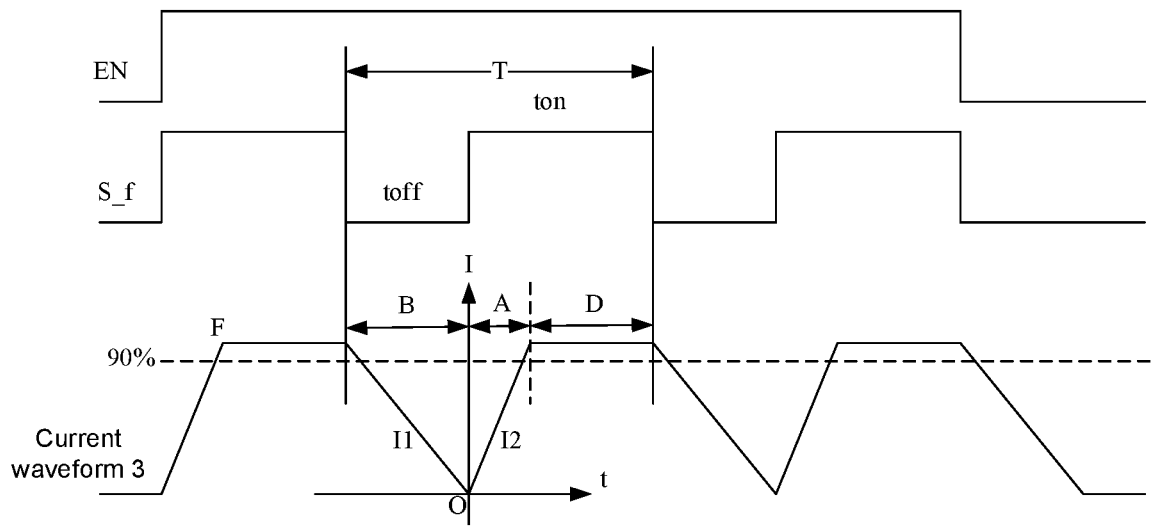
FIG. 25 is a waveform diagram of an enable signal, a shaping signal, and a driving current of a corresponding laser, in accordance with some embodiments of the present disclosure.

For example, as shown in FIG. 25, a Cartesian coordinate system is established based on the current waveform 3. The solution of ton3, toff3, ton4 and toff4 is described by taking an example where an origin O of the Cartesian coordinate system is a point where the driving current is 0, an abscissa of the Cartesian coordinate system is the time t, and an ordinate thereof is the driving current I. Considering an example where the function of the current falling straight line is I1, the slope of the function I1 of the current falling straight line is b, the function of the current rising straight line is I2, and the slope of the function I2 of the current rising straight line is b, as shown in FIG. 25, the slope b of the current falling straight line is:

$$b = \frac{F}{B};$$

the function I1 of me tailing straight line is:

$$I1 = -\frac{F}{B} \times t;$$

the slope a of the current rising straight line is:

$$a = \frac{F}{A};$$

and the function I2 of the rising straight line is:

$$I2 = \frac{F}{A} \times t.$$

Herein, 0≤|t|≤19 μs.

As shown in FIG. 25, since the driving current in the current waveform 3 decreases from the target driving current F to 0, in a case where I1 is equal to F, according to the function I1 of the falling straight line, it can be obtained that toff3 is equal to B (toff3=B). Similarly, according to the function I2 of the rising straight line and the stable duration D in which the current remains stable, it can be obtained that ton3 is equal to a sum of A and D (ton3=A+D). The duration D is a duration in which the target driving current F is output stably.

Similarly, as for the current waveform 4, considering an example where the duration for the laser source driving circuit 403 to decrease the driving current from the target driving current F to 90% of the target driving current F is t1, according to the function I1 of the falling straight line, it can be obtained a formula (4):

$$90\% \times F = -\frac{I0}{B} \times t1; \quad (4)$$

then, it can be obtained that: t1=−0.9×B. toff4=B−|t|=0.1B, that is, the target value F is equal to 0.1 (F=0.1). Considering an example where the duration for the laser source driving circuit 403 to increase the driving current from 0 to 90% of the target driving current F is t2, according to the function I2 of the rising straight line, it can be obtained a formula (5):

$$90\% \times I1 = \frac{F}{A} \times t2, \quad (5)$$

and it can be obtained that: t2=0.9×A. Then, ton4=|t2|+D=A−0.9 A+D=0.1 A+D.

Therefore, the duration toff in which the periodic square wave signal is at an inactive level in each cycle needs to satisfy that: toff4≤toff≤toff3. That is, it needs to satisfy that: 0.1B≤toff≤B. The duration ton in which the periodic square wave signal is at an active level in each cycle needs to satisfy that: ton4≤ton≤ton3. That is, it needs to satisfy that: 0.1 A+D≤ton≤A+D. The cycle of the periodic square wave signal is: T=ton+toff, so it can be obtained that: 0.1 A+D+0.1B≤T≤A+D+B. Since $$f = \frac{1}{T},$$

it can be obtained that the frequency f of the periodic square wave signal satisfies that:

$$\frac{1}{A+D+B} \le f \le \frac{1}{0.1A+D+0.1B}.$$

In addition, since the frequency of the periodic square wave signal satisfies that: f≥1 MHz, that is, $$\frac{1}{A+D+B} \ge 1,$$

it can be determined that the stable duration D needs to satisfy that: D≤1−A−B. For example, if A is equal to 0.2 μs (A=0.2 μs) and B is equal to 0.3 μs (B=0.3 μs), then D is less than or equal to 0.5 μs (D≤0.5 μs). If D is equal to 0.5 μs, then f is greater than or equal to 1 MHz and less than or equal to 1.8 MHz (1 MHz≤f≤1.8 MHz). If D is equal to 0 μs, then f is greater than or equal to 2 MHz and less than or equal to 20 MHz (2 MHz≤f≤20 MHz).

It can be seen from the above analysis that, since the rising duration and falling duration are both fixed values, the value range of the stable duration D may be determined according to the minimum value of the frequency f of the periodic square wave signal.

To sum up, the laser projection apparatus provided by some embodiments of the present disclosure can change the driving current transmitted to the laser. As a result, the cycle of the driving current finally acting on the laser is shortened and the frequency thereof is increased. In addition, within one cycle, the target driving signal may control the laser to be turned on and off frequently, which interrupts the normal steady-state light-emitting process of the laser, increases the probability of the laser selecting laser beams with a plurality of adjacent wavelengths, and expands the spectral width of the laser. As a result, the coherence of the laser beams may be greatly reduced, the speckle phenomenon in the projection image may be reduced or eliminated from the source, and the projection effect of the laser projection apparatus may be improved.

Figure 26:
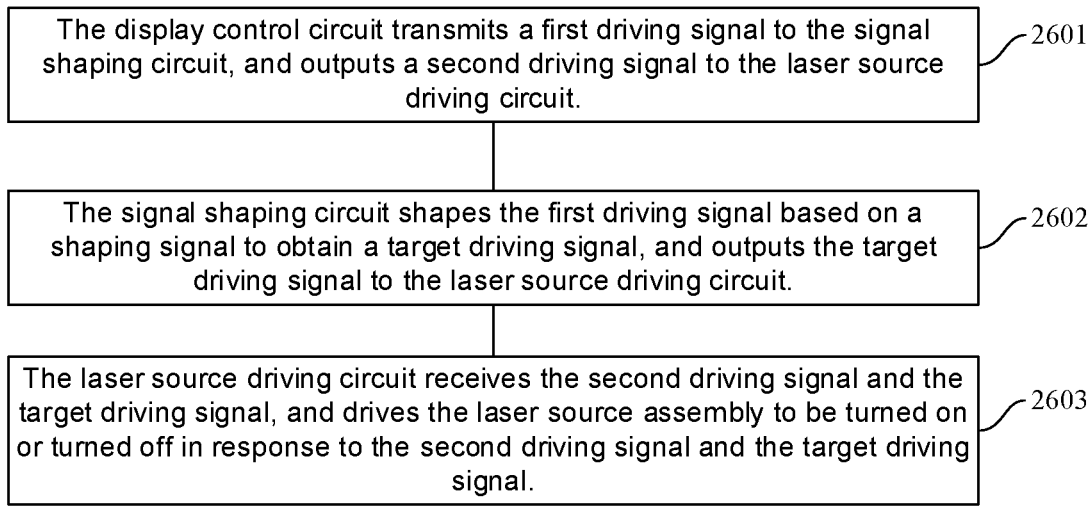
FIG. 26 is a flowchart of a method for driving a laser source assembly, in accordance with some embodiments of the present disclosure.

Some embodiments of the present disclosure further provide a method for driving a laser source assembly, which is applied to a laser projection apparatus. The laser projection apparatus includes a laser source assembly, a display control circuit, a signal shaping circuit, and a laser source driving circuit. As shown in FIG. 26, the method includes the following steps.

In step 2601, the display control circuit transmits a first driving signal to the signal shaping circuit, and outputs a second driving signal to the laser source driving circuit.

The first driving signal includes one of an enable signal and a current control signal, and the second driving signal includes another of the enable signal and the current control signal.

In step 2602, the signal shaping circuit shapes the first driving signal based on a shaping signal to obtain a target driving signal, and outputs the target driving signal to the laser source driving circuit.

A frequency of the target driving signal is higher than a frequency of the first driving signal. For example, the frequency of the target driving signal is N times the frequency of the first driving signal, and N is greater than 5,000. In some embodiments, within one cycle of the first driving signal, a total duration in which the target driving signal is at an active level is less than a duration in which the first driving signal is at an active level.

In step 2603, the laser source driving circuit receives the second driving signal and the target driving signal, and drives the laser source assembly to be turned on or turned off in response to the second driving signal and the target driving signal.

Figure 27:
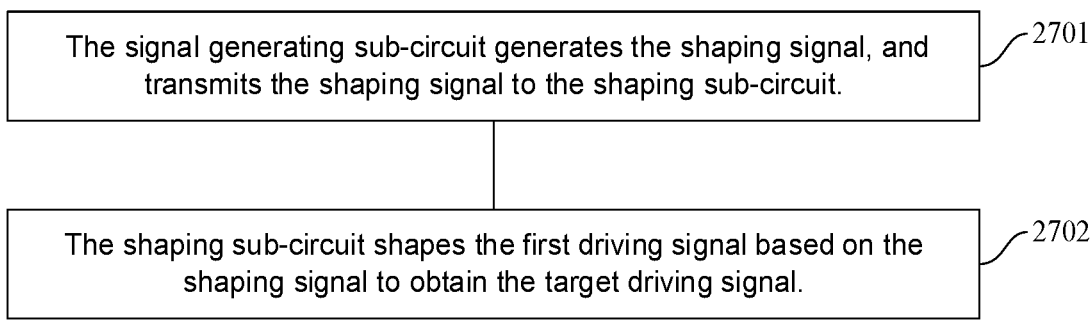
FIG. 27 is a flowchart of another method for driving a laser source assembly, in accordance with some embodiments of the present disclosure.

In some embodiments, the signal shaping circuit includes a signal generating sub-circuit and a shaping sub-circuit. As shown in FIG. 27, the method for driving the laser source assembly further includes the following steps.

In step 2701, the signal generating sub-circuit generates the shaping signal, and transmits the shaping signal to the shaping sub-circuit.

In some embodiments, the laser source assembly includes at least one group of lasers, and amplitudes of the shaping signal include a first amplitude and a second amplitude. When a value of the shaping signal is the first amplitude, the lasers are turned on. When the value of the shaping signal is the second amplitude, the lasers are turned off.

In some embodiments, the shaping signal is a periodic square wave signal, a frequency of the periodic square wave signal is greater than or equal to 100 MHz, and a frequency of the target driving signal is less than or equal to a frequency of the shaping signal.

In some embodiments, the shaping signal is a periodic square wave signal, and a duration in which the periodic square wave signal is at an inactive level in each cycle is a first duration. The first period is less than or equal to a first duration threshold and greater than or equal to a second duration threshold. The first duration threshold is a duration required for a driving current supplied by the laser source driving circuit to the laser source assembly to decrease from a target driving current to 0, and the target driving current is a maximum driving current corresponding to the current control signal. The second duration threshold is a product of the first duration threshold and a target value, and the target value is greater than 0 and less than or equal to 0.1.

In step 2702, the shaping sub-circuit shapes the first driving signal based on the shaping signal to obtain the target driving signal.

The target driving signal is an inactive signal when the first driving signal is an inactive signal, and the target driving signal is related to the shaping signal when the first driving signal is an active signal.

The above method for driving the laser source assembly provided by some embodiments of the present disclosure may shorten the cycle of the driving current transmitted to the laser and increase the frequency thereof. In addition, within a cycle of the target driving signal, the target driving signal may control the laser to be turned on and off frequently, which interrupts the normal steady-state light-emitting process of the laser, expands the spectral width of the laser beam emitted by the laser, and greatly reduces the coherence of the laser beams. Therefore, in a case where the method is applied to a laser projection apparatus for projection display, the speckle phenomenon may be reduced or eliminated.

The foregoing descriptions are merely optional implementations of the present disclosure, and are not intended to limit the present disclosure. Any modification, equivalent replacement, improvement, etc. made within the spirits and principles of the present disclosure shall be included in the protection scope of the present disclosure.

What is claimed is:

1. A laser projection apparatus, comprising:
   a laser source assembly configured to provide illumination beams;
   an optical engine configured to modulate the illumination beams with an image signal to obtain projection beams;
   a projection lens configured to project the projection beams into an image;
   a display control circuit coupled to a signal shaping circuit and a laser source driving circuit, the display control circuit being configured to output a first driving signal and a second driving signal, the first driving signal including one of an enable signal and a current control signal, and the second driving signal including another of the enable signal and the current control signal;
   the signal shaping circuit coupled to the laser source driving circuit, the signal shaping circuit being configured to shape the first driving signal based on a shaping signal to obtain a target driving signal, and a frequency of the target driving signal being higher than a frequency of the first driving signal; and
   the laser source driving circuit coupled to the laser source assembly, the laser source driving circuit being configured to receive the second driving signal and the target driving signal, and drive the laser source assembly to be turned on or turned off in response to the second driving signal and the target driving signal.

2. The laser projection apparatus according to claim 1, wherein the laser source assembly includes a plurality of groups of lasers, and at least one group of lasers in the plurality of groups of lasers is provided with the signal shaping circuit.

3. The laser projection apparatus according to claim 1, wherein, in a cycle of the first driving signal, a total duration in which the target driving signal is at an active level is less than a duration in which the first driving signal is at an active level.

4. The laser projection apparatus according to claim 1, wherein the signal shaping circuit includes:
   a signal generating sub-circuit configured to generate the shaping signal; and
   a shaping sub-circuit coupled to the signal generating sub-circuit, and configured to receive the shaping signal and shape the first driving signal based on the shaping signal to obtain the target driving signal.

5. The laser projection apparatus according to claim 4, wherein the shaping sub-circuit includes a logic AND device; a first input terminal of the logic AND device receives the first driving signal, a second input terminal of the logical AND device receives the shaping signal, and an output terminal of the logical AND device outputs the target driving signal to the laser source driving circuit.

6. The laser projection apparatus according to claim 4, wherein the shaping sub-circuit includes a tristate buffer; a control terminal of the tristate buffer receives the first driving signal, an input terminal of the tristate buffer receives the shaping signal, and an output terminal of the tristate buffer outputs the target driving signal to the laser source driving circuit.

7. The laser projection apparatus according to claim 4, wherein the shaping sub-circuit includes a tristate buffer; an input terminal of the tristate buffer receives the first driving signal, a control terminal of the tristate buffer receives the shaping signal, and an output terminal of the tristate buffer outputs the target driving signal to the laser source driving circuit.

8. The laser projection apparatus according to claim 7, wherein the shaping sub-circuit further includes an inverter; the inverter is coupled to the signal generating sub-circuit and the control terminal of the tristate buffer.

9. The laser projection apparatus according to claim 4, wherein amplitudes of the shaping signal includes a first amplitude and a second amplitude; when a value of the shaping signal is the first amplitude, lasers of the laser source assembly provided with the shaping signal are turned on; and when the value of the shaping signal is the second amplitude value, the lasers are turned off.

10. The laser projection apparatus according to claim 9, wherein the shaping signal includes at least one of a periodic square wave signal, a periodic triangular wave signal, or a periodic sawtooth wave signal.

11. The laser projection apparatus according to claim 10, wherein the shaping signal is the periodic square wave signal, and a frequency of the periodic square wave signal is greater than or equal to 1 MHZ.

12. The laser projection apparatus according to claim 10, wherein a frequency of the periodic square wave signal is greater than or equal to 100 MHz, and the frequency of the target driving signal is less than or equal to a frequency of the shaping signal.

13. The laser projection apparatus according to claim 10, wherein
the shaping signal is the periodic square wave signal, a duration in which the periodic square wave signal is at an inactive level in each cycle is a first duration, and the first duration is less than or equal to a first duration threshold and greater than or equal to a second duration threshold;
the first duration threshold is a duration required to decrease a driving current supplied by the laser source driving circuit to the laser source assembly from a target driving current to 0, the target driving current being a maximum driving current corresponding to the current control signal; and
the second duration threshold is a product of the first duration threshold and a target value, the target value being greater than 0 and less than or equal to 0.1.

14. A method for driving a laser source assembly, applied to a laser projection apparatus, wherein
the laser projection apparatus includes a laser source assembly, a laser source driving circuit, a display control circuit and a signal shaping circuit; and the method comprises:
outputting, by the display control circuit, a first driving signal and a second driving signal, the first driving signal including one of an enable signal and a current control signal, and the second driving signal including another of the enable signal and the current control signal;
shaping, by the signal shaping circuit, the first driving signal based on a shaping signal to obtain a target driving signal, a frequency of the target driving signal being higher than a frequency of the first driving signal;
receiving, by the laser source driving circuit, the second driving signal and the target driving signal, and driving, by the laser source driving circuit, the laser source assembly to be turned on or turned off in response to the second driving signal and the target driving signal.

15. The method according to claim 14, wherein, in a cycle of the first driving signal, a total duration in which the target driving signal is at an active level is less than a duration in which the first driving signal is at an active level.

16. The method according to claim 14, wherein the signal shaping circuit includes a signal generating sub-circuit and a shaping sub-circuit, and the method further comprises:
generating, by the signal generating sub-circuit, the shaping signal; and
shaping, by the shaping sub-circuit, the first driving signal based on the shaping signal to obtain the target driving signal, the target driving signal being an inactive signal when the first driving signal is an inactive signal, and the target driving signal being related to the shaping signal when the first driving signal is an active signal.

17. The method according to claim 16, wherein the laser source assembly includes at least one group of lasers, and amplitudes of the shaping signal includes a first amplitude and a second amplitude; when a value of the shaping signal is the first amplitude, the lasers are turned on; and when the value of the shaping signal is the second amplitude, the lasers are turned off.

18. The method according to claim 16, wherein the shaping signal includes at least one of a periodic square wave signal, a periodic triangular wave signal, or a periodic sawtooth wave signal.

19. The method according to claim 18, wherein a frequency of the periodic square wave signal is greater than or equal to 100 MHz, and a frequency of the target driving signal is less than or equal to a frequency of the shaping signal.

20. The method according to claim 18, wherein
the shaping signal is a periodic square wave signal, and a duration in which the periodic square wave signal is at an inactive level in each cycle is a first duration, and the first duration is less than or equal to a first duration threshold and greater than or equal to a second duration threshold;
the first duration threshold is a duration required to decrease a driving current supplied by the laser source driving circuit to the laser source assembly from a target driving current to 0, the target driving current being a maximum driving current corresponding to the current control signal; and
the second duration threshold is a product of the first duration threshold and a target value, the target value being greater than 0 and less than or equal to 0.1.

\* \* \* \* \*